United States Patent
Ko et al.

(10) Patent No.: US 11,909,961 B2
(45) Date of Patent: Feb. 20, 2024

(54) IMAGE ENCODING/DECODING METHOD AND APPARATUS, AND RECORDING MEDIUM FOR STORING BITSTREAM THAT INVOLVES PERFORMING INTRA PREDICTION USING CONSTRUCTED REFERENCE SAMPLE

(71) Applicant: Intellectual Discovery Co., Ltd., Seoul (KR)

(72) Inventors: Hyun Suk Ko, Daejeon (KR); Jin Ho Lee, Daejeon (KR); Sung Chang Lim, Daejeon (KR); Jung Won Kang, Daejeon (KR); Ha Hyun Lee, Seoul (KR); Dong San Jun, Daejeon (KR); Hui Yong Kim, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 16/766,611

(22) PCT Filed: Nov. 22, 2018

(86) PCT No.: PCT/KR2018/014458
§ 371 (c)(1),
(2) Date: May 22, 2020

(87) PCT Pub. No.: WO2019/103491
PCT Pub. Date: May 31, 2019

(65) Prior Publication Data
US 2021/0136364 A1    May 6, 2021

(30) Foreign Application Priority Data

Nov. 22, 2017 (KR) .......................... 10-2017-0156391
May 23, 2018 (KR) .......................... 10-2018-0058324

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/132* (2014.11);
(Continued)

(58) Field of Classification Search
CPC .... H04N 19/11; H04N 19/132; H04N 19/176; H04N 19/105; H04N 19/593
See application file for complete search history.

(56) References Cited

U.S. PATENT DOCUMENTS 9,374,578 B1 *  6/2016  Mukherjee ........... H04N 19/182
9,838,689 B2    12/2017  Lee et al.
(Continued)

FOREIGN PATENT DOCUMENTS

JP         2013141187 A      7/2013
KR    10-2012-0112037 A     10/2012
(Continued)

OTHER PUBLICATIONS

M. Albrecht et al., Description of SDR, HDR, and 360° video coding technology proposal by Fraunhofer HHI, Joint Video Experts Team (JVET) of ITU-T SG 16 WP 3 and ISO/IEC JTC 1/SC 29/WG 11, Document: JVET-J0014-v4, 10th Meeting: San Diego, US, Apr. 10-20, 2018, Fraunhofer HHI.
(Continued)

*Primary Examiner* — Francis Geroleo
(74) *Attorney, Agent, or Firm* — BROADVIEW IP LAW, PC

(57) ABSTRACT

In performing image encoding/decoding, decoding of an image is performed by deriving an intra prediction mode for a current block, decoding at least one original sample that is
(Continued)

present in a rightmost column and a bottommost row (a bottom row) of the current block, constructing a reference sample by using the at least one decoded original sample and performing intra prediction on the current block by using the constructed reference sample.

9 Claims, 17 Drawing Sheets

(51) Int. Cl.
*H04N 19/132* (2014.01)
*H04N 19/176* (2014.01)
*H04N 19/46* (2014.01)
*H04N 19/50* (2014.01)
*H04N 19/593* (2014.01)
*H04N 19/70* (2014.01)
*H04N 19/80* (2014.01)

(52) U.S. Cl.
CPC .......... *H04N 19/176* (2014.11); *H04N 19/46* (2014.11); *H04N 19/50* (2014.11); *H04N 19/593* (2014.11); *H04N 19/70* (2014.11); *H04N 19/80* (2014.11)

(56) References Cited

U.S. PATENT DOCUMENTS

| | | | |
|---|---|---|---|
| 2011/0293001 A1* | 12/2011 | Lim | H04N 19/14 375/240.12 |
| 2012/0082222 A1* | 4/2012 | Wang | H04N 19/70 375/240.12 |
| 2012/0170648 A1* | 7/2012 | Chen | H04N 19/174 375/240.03 |
| 2013/0108182 A1* | 5/2013 | Yie | G06T 9/004 382/233 |
| 2013/0128961 A1* | 5/2013 | Kim | H04N 19/182 375/240.03 |
| 2016/0156932 A1* | 6/2016 | Lee | H04N 19/176 375/240.13 |
| 2016/0316201 A1 | 10/2016 | Lee et al. | |
| 2017/0272757 A1* | 9/2017 | Xu | H04N 19/593 |
| 2018/0352222 A1* | 12/2018 | Liu | H04N 19/105 |
| 2019/0020888 A1* | 1/2019 | Liu | H04N 19/593 |
| 2019/0104304 A1* | 4/2019 | Lee | H04N 19/176 |
| 2019/0110052 A1* | 4/2019 | Liu | H04N 19/14 |
| 2019/0141318 A1* | 5/2019 | Li | H04N 19/159 |
| 2019/0200011 A1* | 6/2019 | Yoo | H04N 19/176 |
| 2019/0222837 A1* | 7/2019 | Lee | H04N 19/44 |
| 2019/0238835 A1* | 8/2019 | Lee | H04N 19/182 |
| 2020/0045322 A1* | 2/2020 | Ye | H04N 19/167 |
| 2020/0204824 A1* | 6/2020 | Lai | H04N 19/182 |
| 2020/0228831 A1* | 7/2020 | Heo | H04N 19/11 |

FOREIGN PATENT DOCUMENTS

| | | |
|---|---|---|
| KR | 10-2013-0105114 A | 9/2013 |
| KR | 1020160032088 A | 3/2016 |
| KR | 101677480 B1 | 11/2016 |
| KR | 10-2017-0084055 A | 7/2017 |
| KR | 1020170082528 A | 7/2017 |
| KR | 1020170084055 A | 7/2017 |
| KR | 10-2017-0089777 A | 8/2017 |
| KR | 101772459 B1 | 8/2017 |
| KR | 10-2017-0110162 A | 10/2017 |
| KR | 1020170110162 A | 10/2017 |
| KR | 1020170116850 A | 10/2017 |
| WO | 2011/149265 A2 | 12/2011 |
| WO | 2011149265 A2 | 12/2011 |
| WO | 2015009039 A1 | 1/2015 |
| WO | 2016/072775 A1 | 5/2016 |
| WO | 2016072757 A1 | 5/2016 |
| WO | 2016072775 A1 | 5/2016 |
| WO | 2017069419 A1 | 4/2017 |

OTHER PUBLICATIONS

Man-Shu Chiang et al., CE10.1: Combined and multi-hypothesis prediction, Joint Video Experts Team (JVET) of ITU-T SG 16 WP 3 and ISO/IEC JTC 1/SC 29/WG 11, Document: JVET-K0257-v1, 11th Meeting: Ljubljana, SI, Jul. 10-18, 2018, MediaTek Inc.

Yao-Jen Chang et al., Arbitrary reference tier for intra directional modes, Joint Video Exploration Team (JVET) of ITU-T SG 16 WP 3 and ISO/IEC JTC 1/SC 29/WG 11, Document: JVET-C0043r1, 3rd Meeting: Geneva, CH, May 26-Jun. 1, 2016, ITRI International.

* cited by examiner (a)

(b)  (c)

IMAGE ENCODING/DECODING METHOD AND APPARATUS, AND RECORDING MEDIUM FOR STORING BITSTREAM THAT INVOLVES PERFORMING INTRA PREDICTION USING CONSTRUCTED REFERENCE SAMPLE

TECHNICAL FIELD

The present invention relates to a method and apparatus for encoding/decoding an image. More particularly, the present invention relates to a method and apparatus for encoding/decoding an image by using intra prediction, and a recording medium storing a bitstream generated by the method/apparatus for encoding the image.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

The present invention is intended to propose a method and apparatus for encoding/decoding an image with compression efficiency enhanced, and a recording medium storing a bitstream generated by the method/apparatus for encoding the image.

Also, the present invention is intended to propose a method and apparatus for encoding/decoding an image by using intra prediction with compression efficiency enhanced, and a recoding medium storing a bitstream generated by the method/apparatus for encoding the image.

Also, the present invention is intended to propose a method and apparatus for encoding/decoding an image by using intra prediction in which a right and/or bottom reference sample is used, and a recording medium storing a bitstream generated by the method/apparatus for encoding the image.

Technical Solution

A method of decoding an image of the present invention may comprise deriving an intra prediction mode for a current block decoding at least one original sample that is present in a rightmost column and a bottommost row (a bottom row) of the current block, constructing a reference sample by using the at least one decoded original sample and performing intra prediction on the current block by using the constructed reference sample.

In the method of decoding an image of the present invention, when the original sample is included in the rightmost column, the original sample is decoded using a top reference sample of the rightmost column and a left reference sample of the current block, which corresponds to the original sample.

In the method of decoding an image of the present invention, when the original sample is included in the bottommost row, the original sample is decoded using a left reference sample of the bottommost row and a top reference sample of the current block, which corresponds to the original sample.

In the method of decoding an image of the present invention, the constructing of the reference sample comprises performing interpolation on samples that are included in the bottommost row and the rightmost column of the current block by using the at least one decoded original sample.

In the method of decoding an image of the present invention, when the intra prediction mode is a DC mode, an average value used in the DC mode is derived using a sum of values obtained by multiplying a sum of top reference sample values, a sum of left reference sample values, a sum of right reference sample values, and a sum of bottom reference sample values by respective predetermined weighting factors.

In the method of decoding an image of the present invention, when the intra prediction mode is a planar mode, the intra prediction is performed using a weighted sum considering a distance from at least one reference sample among a top reference sample, a left reference sample, a bottom reference sample, and a right reference sample according to a position of an intra prediction target sample of the current block.

In the method of decoding an image of the present invention, when the intra prediction mode is a directional prediction mode, the intra prediction is performed using a first reference sample and a second reference sample that are determined according to a position of an intra prediction target sample of the current block and an intra prediction mode angle.

In the method of decoding an image of the present invention, the intra prediction is performed using a first weighting factor and a second weighting factor that are determined according to a first distance which is a distance between the first reference sample and the prediction target sample and a second distance which is a distance between the second reference sample and the prediction target sample.

In the method of decoding an image of the present invention, a result value of the intra prediction satisfies Equation 1 below, $$Pred_c(x, y) = \frac{(w_{ref1} + w_{ref1\_type}) \cdot Ref1 + (w_{ref2} + w_{ref2\_type}) \cdot Ref2 + (w1 + w2 + w_{ref1\_type} + w_{ref2\_type}) \gg 1}{w1 + w2 + w_{ref1\_type} + w_{ref2\_type}}$$ [Equation 1]

P_red_c(x,y) denotes a prediction value of a sample (x,y); w_ref1 and w_ref2 denote the first weighting factor and the second weighting factor, respectively; w1 and w2 denote the first distance and the second distance, respectively; ref1 and ref2 denote sample values of the first reference sample and the second reference sample, respectively; and w_ref1_type and w_ref2_type denote weighting factors determined with regard to which sample the first reference sample and the second reference sample are included in, among a top reference sample, a left reference sample, a right reference sample, and a bottom reference sample, respectively.

In the method of decoding an image of the present invention, wherein the intra prediction is performed using an overlay predictor that is derived using a weighted sum of a prediction result derived through the intra prediction mode and a prediction result derived through an adjacent intra prediction mode adjacent to the intra prediction mode In the method of decoding an image of the present invention, the adjacent intra prediction mode is determined according to an overlay predictor flag that indicates whether the intra prediction using the overlay predictor is performed and to an index that indicates the adjacent intra prediction mode.

In the method of decoding an image of the present invention, whether the intra prediction using the overlay predictor is performed is determined by comparing an intra prediction cost using the intra prediction mode with an intra prediction cost using the overlay predictor.

In the method of decoding an image of the present invention, wherein the intra prediction is performed by overlay prediction of intra prediction on the current block and inter prediction on the current block, and the overlay prediction is performed using a weighted sum of a prediction result derived through the intra prediction mode and a prediction result derived through an inter prediction mode.

In the method of decoding an image of the present invention, wherein a weighting factor used in the overlay prediction is determined according to at least one among the intra prediction mode and a size of the current block.

In the method of encoding an image of the present invention may comprises deriving an intra prediction mode for a current block, constructing a reference sample by using at least one original sample that is present in a rightmost column and a bottommost row (a bottom row) of the current block, encoding the at least one original sample and performing intra prediction on the current block by using the reference sample.

In the non-temporary storage medium of the present invention, including a bitstream, wherein the bitstream is generated by an image encoding method may deriving an intra prediction mode for a current block, constructing a reference sample by using at least one original sample that is present in a rightmost column and a bottommost row (a bottom row) of the current block, encoding the at least one original sample and performing intra prediction on the current block by using the reference sample.

Advantageous Effects

According to the present invention, it is possible to provide a method and apparatus for encoding/decoding an image with compression efficiency enhanced, and a recording medium storing a bitstream generated by the method/apparatus for encoding the image.

Also, according to the present invention, it is possible to provide a method and apparatus for encoding/decoding an image by using intra prediction with compression efficiency enhanced, and a recording medium storing a bitstream generated by the method/apparatus for encoding the image.

Also, according to the present invention, it is possible to provide a method and apparatus for encoding/decoding an image by using intra prediction in which a right and/or bottom reference sample is used, and a recoding medium storing a bitstream generated by the method/apparatus for encoding the image.

MODE FOR INVENTION

Figure 1:
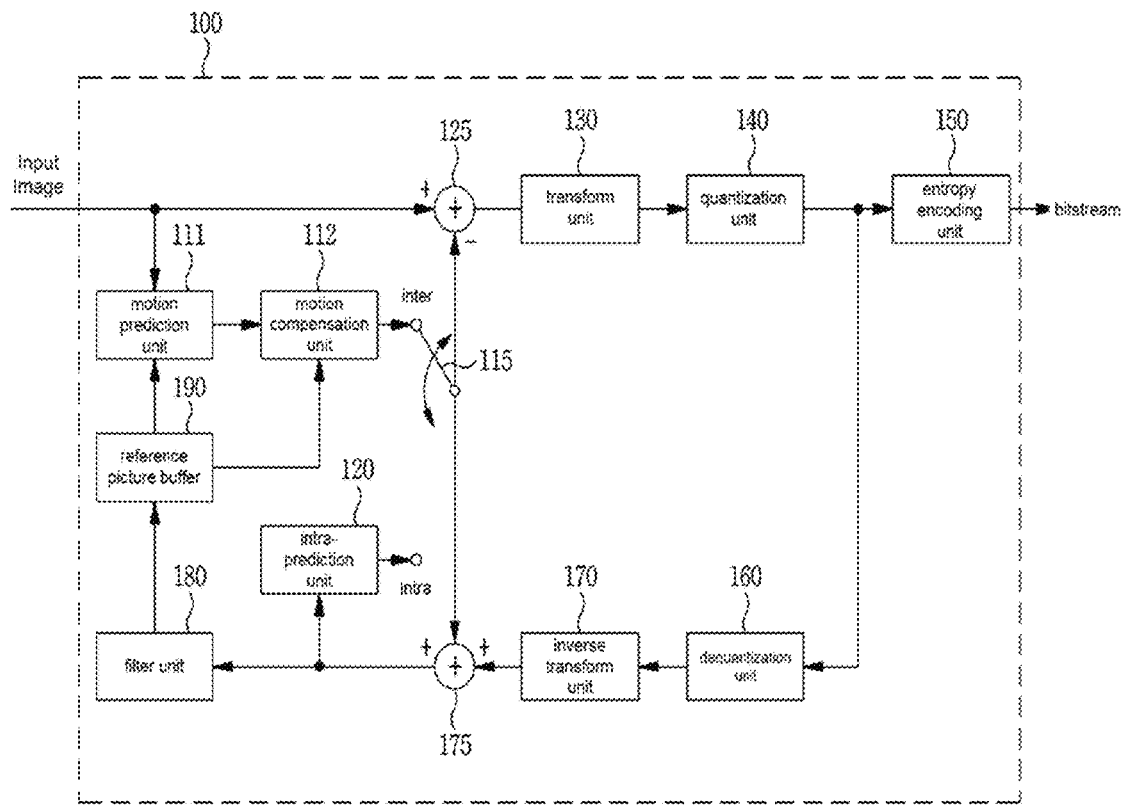
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method, a ternary-tree partitioning method, etc. to configure a lower unit such as coding unit, prediction unit, transform unit, etc. It may be used as a term for designating a sample block that becomes a process unit when encoding/decoding an image as an input image. Here, a quad-tree may mean a quarternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may mean a list including one or more reference pictures used for inter prediction or motion compensation. LC (List Combined), L0 (List 0), L1 (List 1), L2 (List 2), L3 (List 3) and the like are types of reference picture lists. One or more reference picture lists may be used for inter prediction.

Inter prediction Indicator: may mean an inter prediction direction (uni-directional prediction, bi-directional prediction, and the like) of a current block. Alternatively, the inter prediction indicator may mean the number of reference pictures used to generate a prediction block of a current block. Further alternatively, the inter prediction indicator may mean the number of prediction blocks used to perform inter prediction or motion compensation with respect to a current block.

Prediction list utilization flag: may represent whether a prediction block is generated using at least one reference image included in a specific reference picture list. An inter prediction indicator may be derived using a prediction list utilization flag, and reversely, a prediction list utilization flag may be derived using an inter prediction indicator. For example, when a prediction list utilization flag indicates a first value of "0", it represents a prediction block is not generated using a reference picture included in the corresponding reference picture list. When a prediction list utilization flag indicates a second value of "1", it represents a prediction block is generated using a reference picture included in the corresponding reference picture list.

Reference Picture Index: may mean an index indicating a specific reference picture in a reference picture list.

Reference Picture: may mean a picture to which a specific block refers for inter prediction or motion compensation. Alternatively, a reference picture may be a picture including a reference block referred to by a current block for inter prediction or motion compensation. Hereinafter, the tem "reference picture" and "reference image" may be used as the same meaning and used interchangeably.

Motion Vector: is a two-dimensional vector used for inter prediction or motion compensation and may mean an offset between a reference picture and an encoding/decoding target picture. For example, (mvX, mvY) may represent a motion vector, mvX may represent a horizontal component, and mvY may represent a vertical component.

Search Range: may be a 2-dimensional region where search for a motion vector during inter prediction is performed. For example, a size of a search range may be M×N. M and N may be a positive integer, respectively.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list configured using one or more motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter prediction indicator, and at least any one among reference picture list information, a reference picture, a motion vector candidate, a motion vector candidate index, a merge candidate, and a merge index.

Merge Candidate List: may mean a list composed of merge candidates.

Merge Candidate: may mean a spatial merge candidate, a temporal merge candidate, a combined merge candidate, a combined bi-prediction merge candidate, a zero merge candidate, or the like. The merge candidate may have an inter prediction indicator, a reference picture index for each list, and motion information such as a motion vector.

Merge Index: may mean an indicator indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether to partition of a ternary-tree form, a partition direction of a ternary-tree form (horizontal direction or vertical direction), a partition form of a ternary-tree form (symmetric partition or asymmetric partition), whether to partition of a multi-type-tree form, a partition direction of a multi-type-tree form (horizontal direction or vertical direction), a partition form of a multi-type-tree form (symmetric partition or asymmetric partition), a partitioning tree of multi-type-tree form, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/foam, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
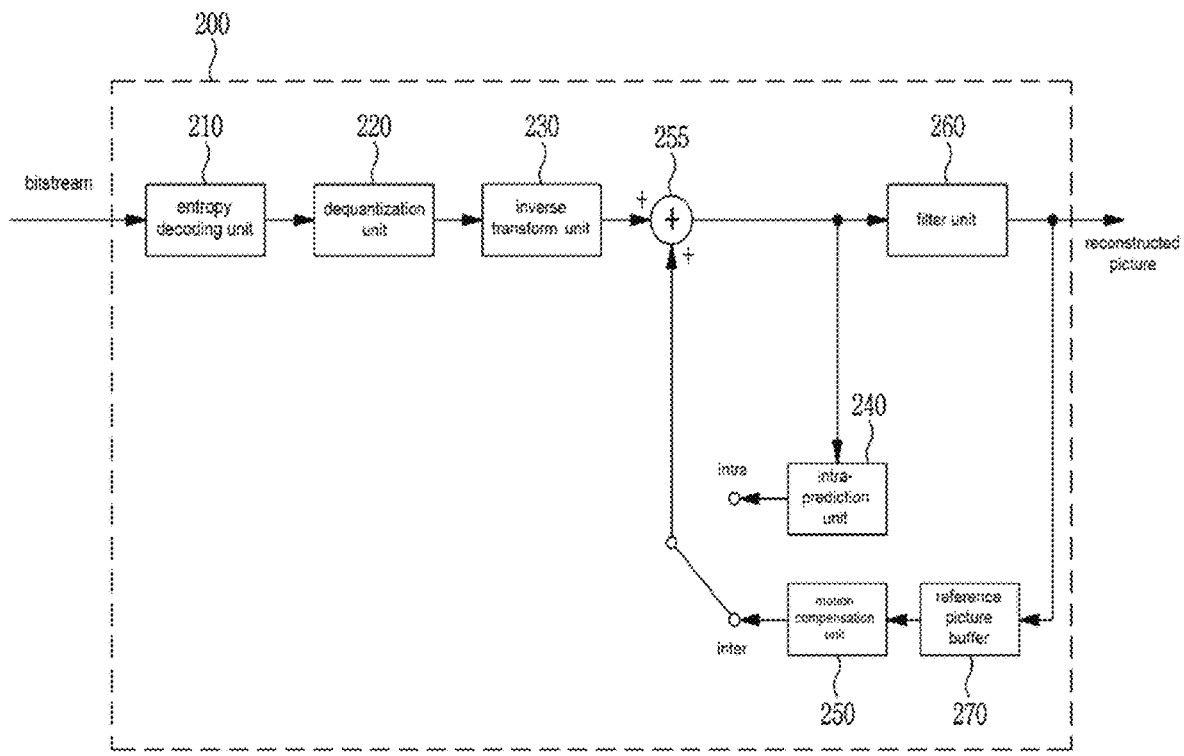
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 255 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
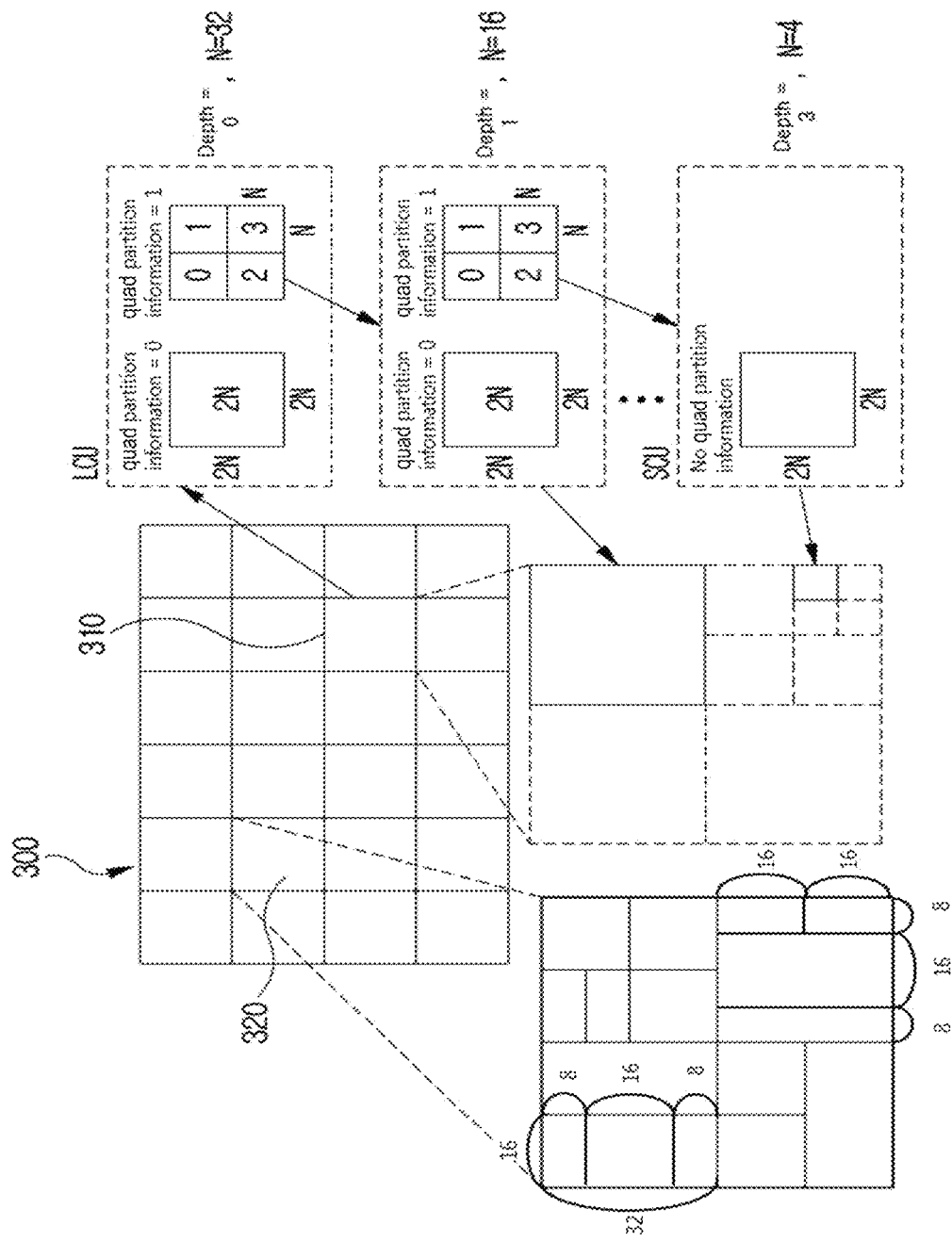
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within a CTU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of a CTU may be 0, and a depth of a smallest coding unit (SCU) may be a predefined maximum depth. Herein, the CTU may be a coding unit having a maximum coding unit size, and the SCU may be a coding unit having a minimum coding unit size as described above. Partitioning is started from the CTU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, a CTU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned (quad-tree partitioned) into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. For example, when a coding unit having a size of 8×32 is horizontally partitioned into two sub-coding units, each of the two sub-coding units may have a size of 8×16. When a single coding unit is partitioned into two coding units, it may be called that the coding unit is partitioned (binary-tree partitioned) in a binary-tree form.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-tree partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is partitioned by a multi-type tree partition structure, the coding unit may further include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is partitioned by a multi-type tree partition structure, the current coding unit may further include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quad-tree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bitstream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra slice and an inter slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra slice, the maximum size of a ternary tree may be 32×32. For example, for an inter slice, the maximum size of a ternary tree may be 128×128.

For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-tree partitioned or ternary-tree partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-tree partitioned or ternary-tree partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-tree partitioned and/or ternary-tree partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-tree partitioned and/or ternary-tree partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
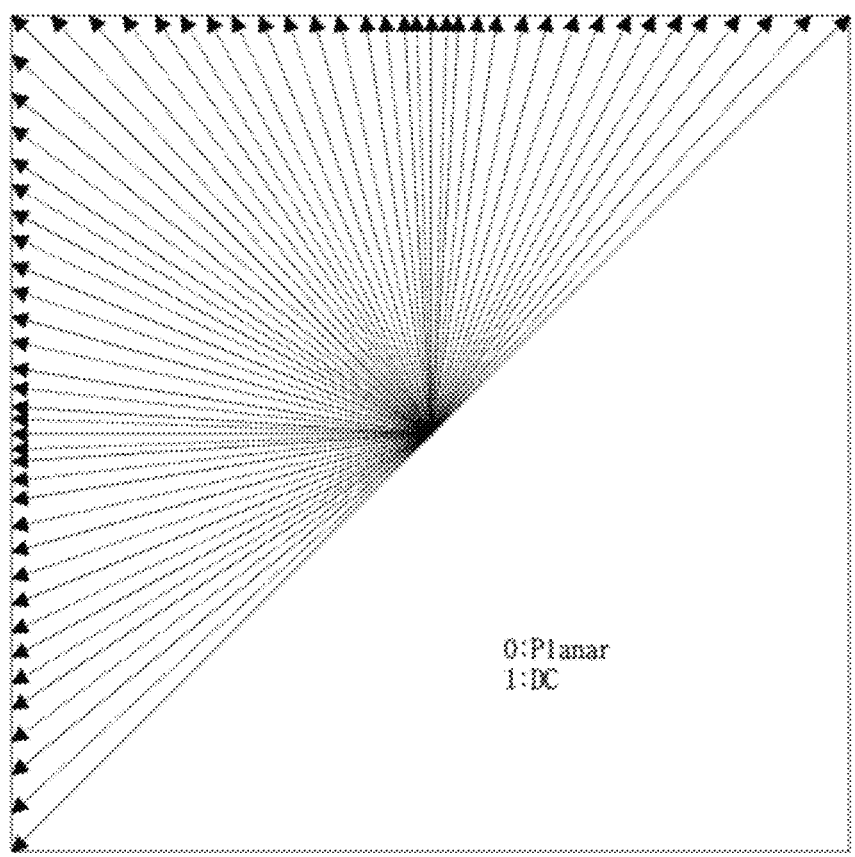
FIG. 4 is a view for explaining an embodiment of a process of intra prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than or equal to 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size/shape.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Hereinafter, an intra prediction method according to the present invention will be described with reference to the drawings.

Figure 5:
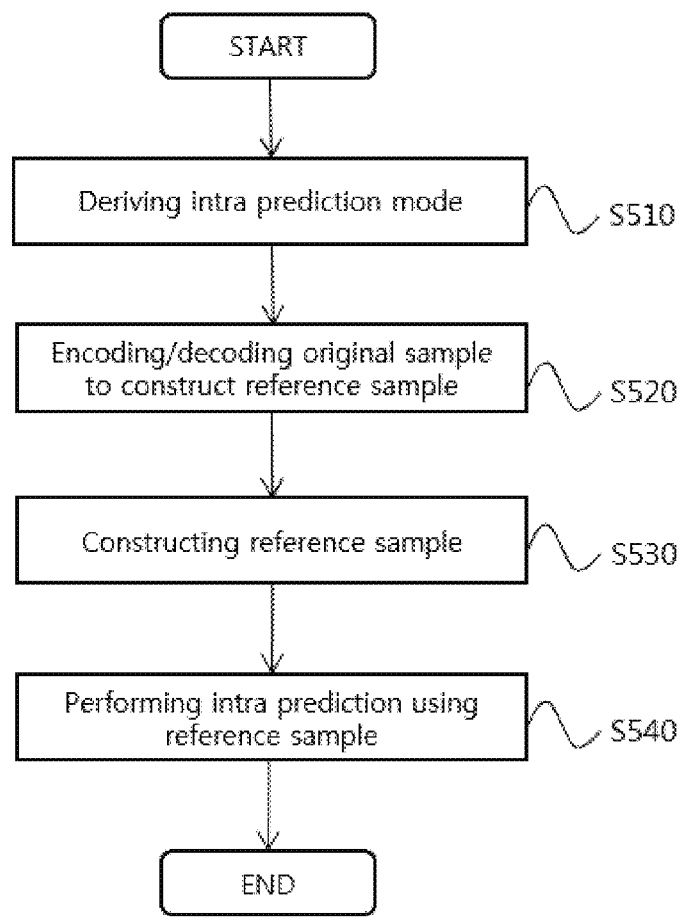
FIG. 5 is a diagram illustrating an intra prediction method according to the present invention.

FIG. 5 is a diagram illustrating an intra prediction method according to the present invention.

The intra prediction method shown in FIG. 5 may be performed by the encoding apparatus 100 or the decoding apparatus 200. The intra prediction method for the current block may include: deriving an intra prediction mode at step S510; encoding or decoding an original sample to construct a reference sample at step S520; constructing the reference sample for intra prediction at step S530; and performing intra prediction on the current block by using the reference sample at step S540.

At step S510, the intra prediction mode of the current block may be derived. The intra prediction mode of the current block may be derived using a method of using an intra prediction mode of a neighboring block, a method of entropy encoding/decoding the intra prediction mode of the current block from the bitstream, a method of using a coding parameter of a neighboring block, or a method of using an intra prediction mode of a color component. According to the method of using the intra prediction mode of the neighboring block, the intra prediction mode of the current block may be derived using at least one of the intra prediction modes that are derived using the intra prediction mode of the neighboring block, a combination of one or more intra prediction modes of the neighboring block, and at least one MPM.

At step S520, encoding or decoding of the original sample may be performed to construct the reference sample. The encoding or decoding of the original sample may include determining the positions and/or the number of original samples and/or encoding or decoding the determined original sample. The encoding or decoding of the original sample according to the present invention may be performed to construct the right reference sample and/or the bottom reference sample of the current block.

At step S530, the reference sample for intra prediction of the current block may be constructed. The constructing of the reference sample may include constructing reference samples in the four directions and/or performing filtering on the reference sample. At step S530, selection of the reference sample, and padding of the reference sample may be performed additionally.

At step S540, intra prediction on the current block may be performed using at least one among directional prediction in which DC mode prediction, planar mode prediction, bi-angular prediction are used, and intra prediction in which an overlay predictor is used.

Hereinafter, for convenience, an embodiment in which the decoder performs intra prediction will be described. However, it is possible for the encoder to implement the present invention by the corresponding method, and the scope of the present invention is not limited to the operation of the decoder.

Hereinafter, a method of encoding or decoding a part of the original sample for intra prediction will be described in detail.

Figure 6:
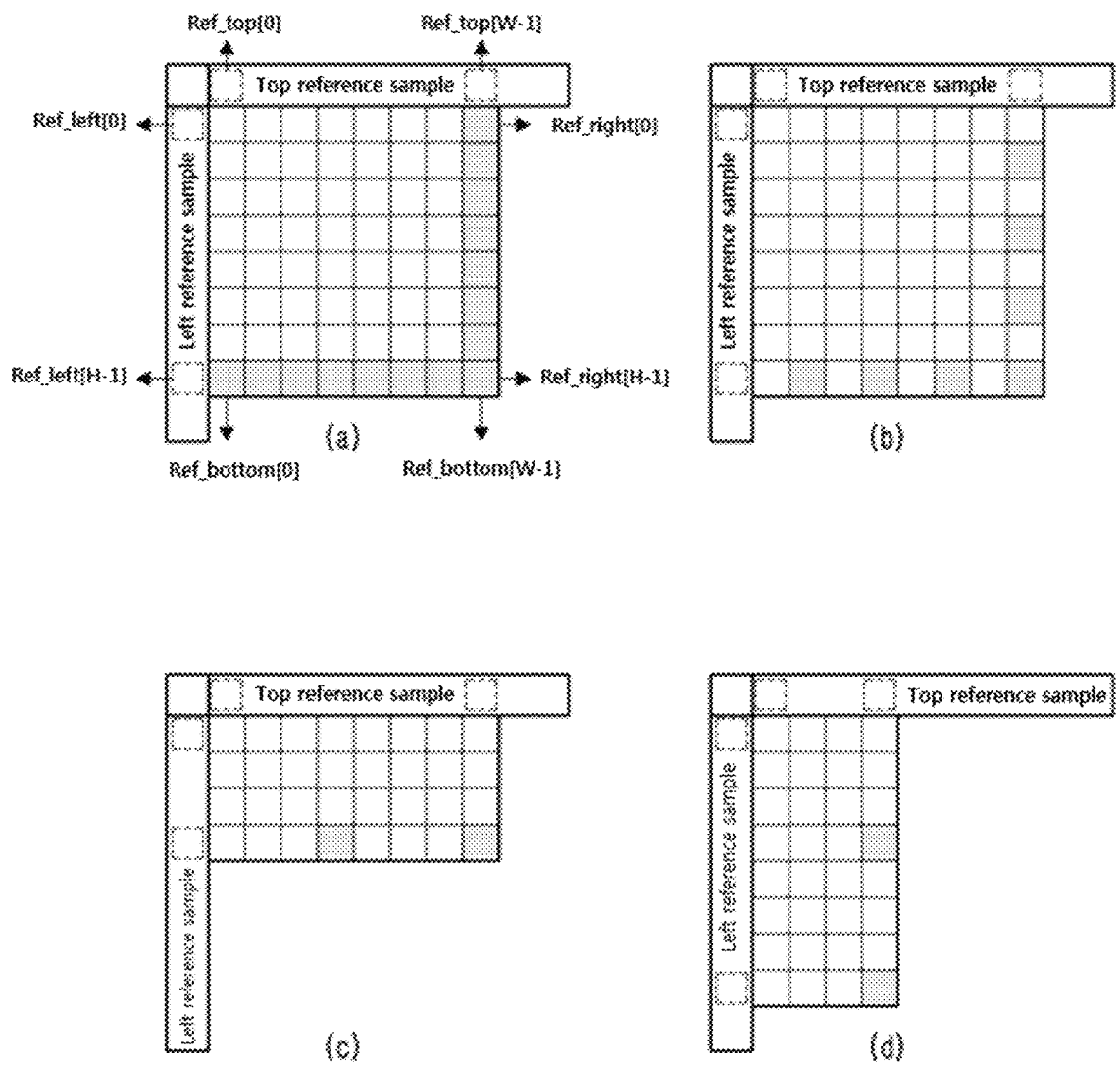
FIG. 6 is a diagram illustrating a predictive coding/decoding method of an original sample.

FIG. 6 is a diagram illustrating a predictive coding/decoding method of an original sample.

FIGS. 6(a) to 6(d) show examples of decoding an original sample to perform intra prediction on the current block of which the horizontal length is W and the vertical length is H. The decoder may use the top reference sample and/or the left reference sample to predict an original sample that is present in the rightmost column of an original sample and/or an original sample that is present in the bottommost row, and may entropy decode a residual signal generated according to prediction. In the following description, the original sample block and the current block may have the same meaning.

For example, as shown in FIG. 6(a), the decoder may decode H original samples in the rightmost column and/or W original samples in the bottommost row.

As another example, as shown in FIG. 6(b), the decoder may predictively code/decode K original samples in the rightmost column and/or L original samples in the bottommost row. Here, K may be a positive integer that satisfies $K<=H$, and L may be a positive integer that satisfies $L<=W$.

In FIG. 6, Ref_top[x] denotes a set of top reference samples, and Ref_left[y] denotes a set of left reference samples. Further, Org_bottom[x] and Org_right[y] denote sets of decoded original samples that may be present in the bottommost row and the rightmost column of the original sample, respectively. Here, x may be a positive integer that satisfies $0<=x<=W-1$, and y may be a positive integer that satisfies $0<=y<=H-1$.

For example, when K is four, the positions of the original samples decoded by the decoder are Org_right[H*(¼)−1], Org_right[H*(2/4)−1], Org_right[H*(¾)−1], and Org_right [H−1]. As another example, when K is two, the positions of the original samples decoded by the decoder are Org_right [H*(2/4)−1] and Org_right [H−1]. As still another example, when L is four, the positions of the original samples decoded by the decoder are Org_bottom[W*(¼)−1], Org_bottom [W*(2/4)−1], Org_bottom[W*(¾)−1], and Org_bottom

[W−1]. As still another example, when K is two, the positions of the original samples decoded by the decoder are Org_bottom[W*(¾)−1] and Org_bottom[W−1].

As another example, as shown in FIG. 6(c), when an original sample block is a non-square block that satisfies W>H and the decoder decodes K original samples in the rightmost column and/or L original samples in the bottommost row, L is a positive integer larger than K. For example, L=2 and K=1 are possible.

Conversely, as shown in FIG. 6(d), when the original sample block is a non-square block that satisfies W<H and the decoder decodes K original samples in the rightmost column and/or L original samples in the bottommost row, L is a positive integer smaller than K. For example, L=1 and K=2 are possible.

Here, the original sample in the rightmost column to be decoded may be obtained according to Equation 1 below. That is, the original sample in the rightmost column may be decoded using a weighted sum of the top reference sample in the rightmost column and/or the left reference samples corresponding to respective original samples.

$$Res_{right}[i]=Org_{right}[i]-(w1*Ref_{top}[W-1]+w2*Ref_{left}[i]), \text{ where } i=0 \text{ to } H-1, w1+w2=1 \quad \text{[Equation 1]}$$

Further, the original sample in the bottommost row may be obtained according to Equation 2 below. That is, the original sample in the bottommost row may be decoded using a weighted sum of the left reference sample in the bottommost row and/or the top reference samples corresponding to respective original samples.

$$Res_{bottom}[i]=Org_{bottom}[i]-(w1*Ref_{left}[H-1]+w2\times Ref_{top}[i]), \text{ where } i=0 \text{ to } W-1, w1+w2=1 \quad \text{[Equation 2]}$$

Figure 7:
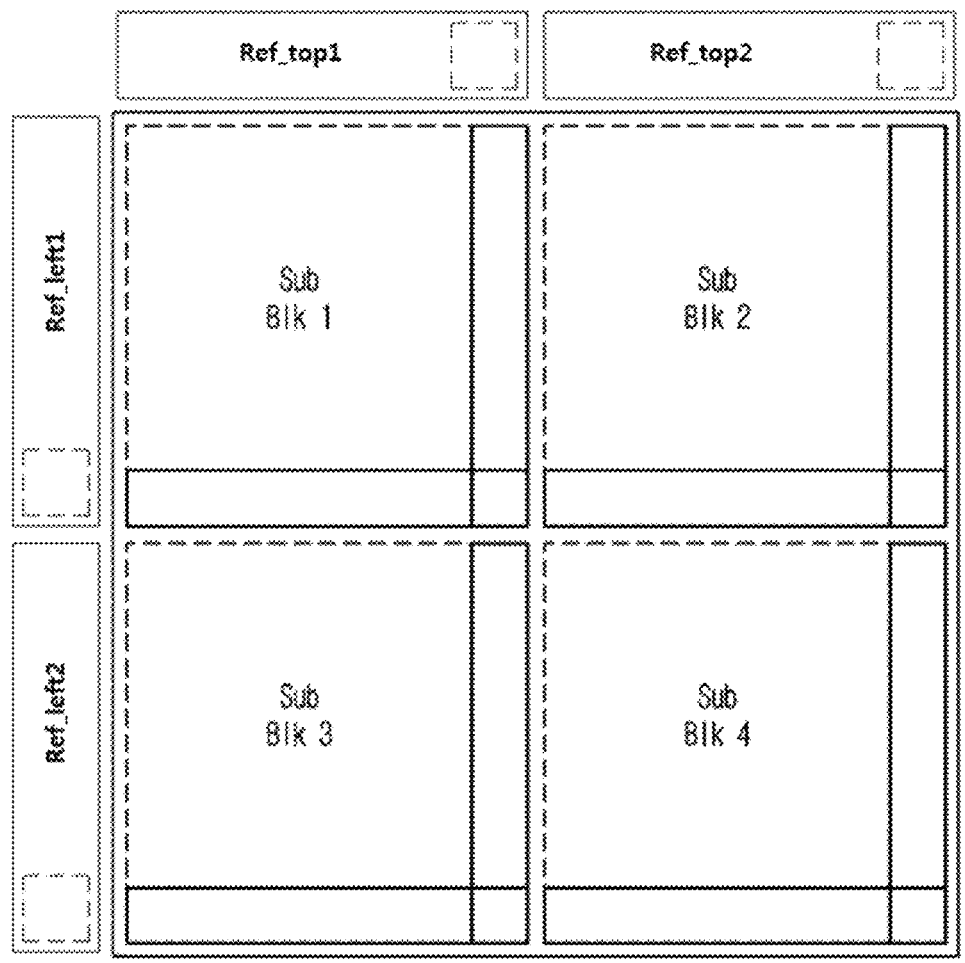
FIG. 7 is a diagram illustrating a predictive coding/decoding method of an original sample.

FIG. 7 is a diagram illustrating a predictive coding/decoding method of an original sample.

FIG. 7 shows an example in which the current block is divided into multiple sub blocks. When the current block is divided into multiple sub blocks, the decoder predicts, with respect to the rightmost column and the bottommost row of each sub block, the original samples corresponding to a predetermined number and positions and entropy encode/decode the residual signal generated according to prediction.

Here, the predetermined number and positions of the original samples that each sub block has may be determined individually according to the methods described in FIGS. 6(a) to 6(d).

When the current block is divided into four sub blocks as shown in FIG. 7, the decoder decodes the sub blocks according to at least one of the following orders.

For example, the decoder may decode the sub blocks, Sub_blk1→Sub_blk2→Sub_blk3→Sub_blk4 in that order.

As another example, the decoder may decode the sub blocks, Sub_blk1→Sub_blk3→Sub_blk2→Sub_blk4 in that order.

As another example, the decoder may decode the sub blocks, Sub_blk1→Sub_blk4→Sub_blk2→Sub_blk3 in that order.

As another example, the decoder may decode the sub blocks, Sub_blk1→Sub_blk4→Sub_blk3→Sub_blk2 in that order.

As another example, the decoder may decode the sub blocks, Sub_blk4→Sub_blk3→Sub_blk2→Sub_blk1 in that order.

As another example, the decoder may decode the sub blocks, Sub_blk4→Sub_blk2→Sub_blk3→Sub_blk1 in that order.

As another example, the decoder may decode the sub blocks, Sub_blk4→Sub_blk1→Sub_blk2→Sub_blk3 in that order.

As another example, the decoder may decode the sub blocks, Sub_blk4→Sub_blk2→Sub_blk1→Sub_blk3 in that order.

As another example, on the basis of the intra prediction mode of the current block, the decoding order of the sub blocks may be determined. For example, when the intra prediction mode is a directional mode of which a mode number is larger than that of the vertical mode, the decoder decodes the sub blocks, Sub_blk2→ Sub_blk1→ Sub_blk4→Sub_blk3 in that order. As another example, when the intra prediction mode is a directional mode of which a mode number is smaller than that of the horizontal mode, the decoder decodes the sub blocks, Sub_blk3→Sub_blk1→Sub_blk4→Sub_blk2 in that order.

As another example, on the basis of the size of the current block, the decoding order of the sub blocks may be determined. For example, when the size of the current block exceeds a preset value, the decoder decodes the sub blocks, Sub_blk2→Sub_blk1→Sub_blk4→Sub_blk3 in that order. As another example, when the size of the current block is equal to or smaller than the preset value, the decoder decodes the sub blocks, Sub_blk3→Sub_blk1→ Sub_blk4→Sub_blk2 in that order.

That is, the decoder may, on the basis of the intra prediction mode or the size of the current block, determine the decoding order of the sub blocks adaptively.

When the decoder constructs the top reference sample and/or the left reference sample of each sub block, the reference sample of the current block is used or the reconstruction sample of the pre-decoded sub block is used.

For example, when the decoder decodes the original samples of the sub blocks, Sub_blk4→Sub_blk3→Sub_blk2→Sub_blk1 in that order, the decoder uses Ref_top2 as the top reference sample of sub_blk4 or uses the bottommost reconstruction sample of Sub_blk2. Also, the decoder uses Ref_left2 as the left reference sample of sub_blk4 or uses the rightmost reconstruction sample of Sub_blk3. Also, Ref_top1 may be used as the top reference sample of sub_blk3, or the bottommost reconstruction sample of Sub_blk1 may be used. Also, Ref_left1 may be used as the left reference sample of sub_blk2, or the rightmost reconstruction sample of Sub_blk1 may be used.

Even when the decoder decodes the sub blocks in the order different from the above description, the decoder performs original sample decoding for the right reference sample and/or the left reference sample with respect to each sub block in the same manner.

Hereinafter, a method of constructing, by the decoder, a reference sample used for intra prediction will be described.

Figure 8:
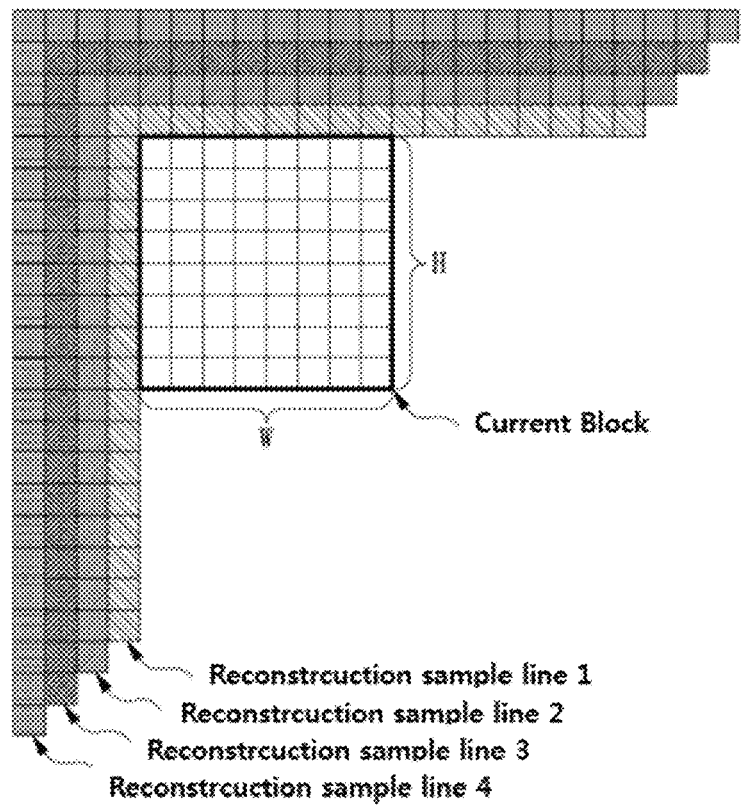
FIG. 8 is a diagram illustrating multiple reconstruction sample lines.

FIG. 8 is a diagram illustrating multiple reconstruction sample lines.

The decoder may construct the reference sample to perform intra prediction for the current block or for the sub block of the current block. Hereinafter, the case in which the decoder constructs the reference sample for the current block will be described as an example. This description is an example, and the decoder may construct the reference sample for the sub block in the same manner as the reference sample for the current block.

Here, the reference sample may be constructed by one or more reconstructed samples near the current block or a combination of the reconstructed samples. The decoder may perform filtering, in additional construction of the reference sample. Here, the decoder may construct the reference samples using the reconstruction samples on the multiple reconstruction sample lines as they are, or may construct the reference samples by performing filtering between samples on one reconstruction sample line or filtering between samples on different reconstruction sample lines.

Here, a set of the constructed reference samples may be designated by ref[m, n]. Further, a nearby reconstructed sample or a sample obtained by filtering this may be designated by rec[m, n]. Here, m or n may be predetermined integer values. When the horizontal and vertical sizes of the current block are W and H, respectively, the top left sample within the current block is in the position (0, 0). Here, on the basis of the position of the top left sample, the relative position of the top left reference sample nearest thereto may be set to (−1, −1).

The reference sample may be constructed by selecting one or more reconstruction sample lines adjacent to the current block. For example, the reference sample may be constructed by selecting one line among the multiple reconstruction sample lines in FIG. 8.

For example, a particular line among the reconstruction sample lines may be selected in a fixed or adaptive manner.

As another example, one or more reconstruction sample lines are selected among the multiple reconstruction sample lines in FIG. 8, and the one or more selected reconstruction sample lines are combined, thereby constructing the reference sample.

For example, the decoder may construct the reference sample according to Equation 3 below. Specifically, the decoder may construct the reference sample using a weighted average wherein different weighting factors are applied according to the distance from the current block to the reconstruction sample line.

$$\text{ref}[-1,-1]=(\text{rec}[-2,-1]+2*\text{rec}[-1,-1]+\text{rec}[-1,-2]+2)>>2$$

$$\text{ref}[x,-1]=(\text{rec}[x,-2]+3*\text{rec}[x,-1]+2)>>2,$$
$$(x=0 \sim H+W-1)$$

$$\text{ref}[-1,y]=(\text{rec}[-2,y]+3*\text{rec}[-1,y]+2)>>2,$$
$$(y=0 \sim H+W-1) \quad [\text{Equation 3}]$$

Alternatively, on the basis of at least one among the distance from the current block and the intra prediction mode, the reference sample may be constructed using at least one among the average value, the maximum value, the minimum value, the median value, and the mode of multiple reconstruction samples.

Alternatively, the reference sample may be constructed on the basis of a change (variation) of values of multiple consecutive reconstruction samples. For example, the reference sample may be constructed on the basis of at least one among whether the difference value between two consecutive reconstruction samples is equal to or greater than a threshold value and whether the values of multiple consecutive reconstruction samples changes in a consecutive or inconsecutive manner. For example, when the difference value between rec[−1, −1] and rec[−2, −1] is equal to or greater than the threshold value, ref[−1, −1] is determined to be rec[−1, −1] or is determined to be a value obtained by applying a weighted average wherein a predetermined weighting factor is assigned to rec[−1, −1]. For example, the values of multiple consecutive reconstruction samples change by n towards the current block, reference sample ref[−1, −1]=rec[−1, −1]−n is determined.

As still another example, the reference sample may be constructed by selecting two or more reconstruction sample lines in FIG. 8. For example, the reference sample may be constructed by selecting a reconstruction sample line 1 and a reconstruction sample line 2 fixedly or by selecting four lines that correspond to a reconstruction sample line 1 to a reconstruction sample line 4.

Alternatively, the reference sample may be constructed by selecting two or more reconstruction sample lines adaptively. For example, the reference sample may be constructed by selecting one line fixedly and selecting other one or more lines adaptively.

The fixedly selected line may be pre-defined by the encoder/decoder. If pre-defined, information on the fixedly selected line may not be signaled from the encoder to the decoder.

Here, information on the adaptively selected line may be signaled in the form of an indicator or an index. The adaptively selected line may be determined using at least one among the coding parameters, such as the size/shape of the current block or of the neighboring block, the intra prediction mode, and the like. In the case, information required for selection may not be signaled.

Here, the reference sample line may consist of one or more samples. For example, one reference sample line may be in a length equal to the horizontal or vertical length of the current block. Alternatively, one reference sample line may be in a length that is twice the horizontal or vertical length of the current block. Alternatively, one reference sample line may be in a length that is twice the horizontal or vertical length of the current block. Alternatively, one reference sample line may be in a length wherein 1, 2, 3, . . . , or N samples are added to twice the horizontal and vertical lengths of the current block. That is, the reference sample line may be in 2*(W+H)+N, and N may be an integer of one or more.

The method of constructing the reference sample adjacent to the top of the current block may be different from the method of constructing the reference sample adjacent to the left. For example, the number of reference sample lines on the top may be configured to be different from the number of reference sample lines on the left. For example, according to at least one among the horizontal or vertical size of the current block and the intra prediction mode, one reference sample line adjacent to the top and two reference sample lines adjacent to the left may be constructed. For example, the length of the reference sample line on the top may be configured to be different from the length of the reference sample line on the left. For example, the length may be configured differently according to at least one among the horizontal or vertical size of the current block and the intra prediction mode.

The length of the reference sample line may be configured to vary with each reference sample line. For example, in FIG. 8, the lengths of the reconstruction sample line 2 to the reconstruction sample line 4 may be configured to be longer than the length of the reconstruction sample line 1 by one or more samples.

The length of the reference sample line may vary with each reconstruction sample line. For example, the reconstruction sample line n may be configured to be longer or shorter than the reconstruction sample line n−1 by m samples. In the example shown in FIG. 8, the reconstruction sample line n may be configured to be longer than the reconstruction sample line n−1 by one sample.

As described above, it is possible to encode/decode information on whether to construct the reference sample using only the nearest reference sample line or to construct the reference sample using multiple reference sample lines. For example, the information may be encoded/decoded at at least one level among sequence, picture, slice, tile, CTU, CU, PU, and TU levels. Further, information on availability of multiple reference sample lines may be signaled at the higher level.

At least one among the number, the positions, and the configuration method of the reconstruction sample lines used in constructing the reference sample may be set differently according to whether the top or left boundary of the current block corresponds to at least one among boundaries of a picture, a slice, a tile, and a coding tree block (CTB).

For example, when the top or left boundary of the current block corresponds to at least one among the boundaries of the picture, the slice, the tile, and the coding tree block (CTB), the decoder does not receive a particular indicator (index) from an encoder and may initialize (default) the indicator value to a preset value. For example, the preset value may be zero.

On the other hand, when the top or left boundary of the current block does not correspond to at least one among the boundaries of the picture, the slice, the tile, and the coding tree block (CTB), the decoder constructs the reference sample line using the samples that are present at the indicated positions, according to the indicator value signaled from the encoder.

For example, in the case of constructing two or more reference sample lines, when the top boundary of the current block corresponds to at least one among the boundaries of the picture, the tile, the slice, and the coding tree block (CTB), one reference sample line adjacent to the top is constructed. For example, when the top boundary of the current block is the top boundary of the CTU, only one reference sample line is constructed. Otherwise, two or more reference sample lines are constructed. Here, by using only one reference sample line of the top boundary of the CTU, the effect of reducing the line buffer for storage in the memory is achieved.

In selecting the reference sample, availability determination of the block that includes the reference sample and reference sample padding may be performed. For example, when the block that includes the reference sample is available, the corresponding reference sample is used without padding. Conversely, when the block that includes the reference sample is unavailable, the unavailable reference sample is subjected to padding using one or more available nearby reference samples, thereby replacing the unavailable reference sample.

For example, when the reference sample are present outside at least one among the boundaries of the picture, the tile, the slice, and the coding tree block (CTB), and a predetermined boundary, the reference sample is determined to be unavailable. As another example, in the case of encoding the current block with constrained intra prediction (CIP), when the block that includes the reference sample is encoded/decoded in the inter mode, the reference sample is determined to be unavailable.

Figure 9:
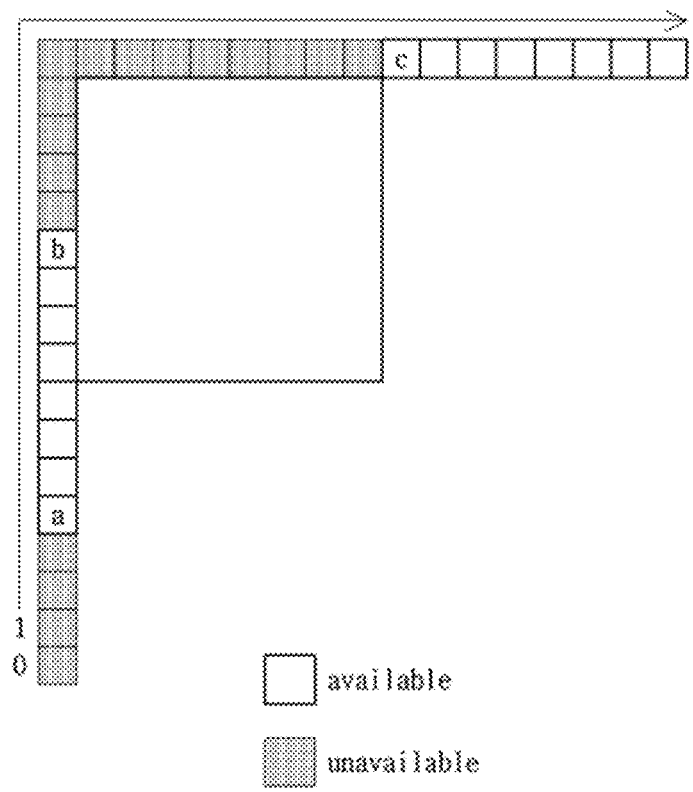
FIG. 9 is a diagram illustrating a process of replacing an unavailable sample with an available sample.

FIG. 9 is a diagram illustrating a process of replacing an unavailable sample with an available sample.

When determining that the nearby reconstructed sample is unavailable, the unavailable sample is replaced by the available nearby reconstructed sample. For example, as shown in FIG. 9, when the available samples and the unavailable samples are simultaneously present, one or more available samples are used to fill the unavailable samples.

The sample value of the unavailable sample may be replaced by the sample value of the available sample in a predetermined order. The available sample used to replace the unavailable sample may be an available sample adjacent to the unavailable sample. When there is no nearby available sample, the first or the closest available sample is used. The replacement order of unavailable samples may be, for example, from the bottom left to the top right. Alternatively, the order may be from the top right to the bottom left. Alternatively, the order may be from the top left corner to the top right and/or to the bottom left. Alternatively, the order may be from the top right and/or from the bottom left to the top left corner.

For example, starting from zero which is the sample position in the lower left, the unavailable sample is filled with the available sample. That is, the first four unavailable samples are filled with a value of "a", and the following 13 unavailable samples are filled with a value of "b".

As another example, a combination of available samples may be used for filling. For example, an average value or interpolation of available samples that are positioned at the both ends of the unavailable sample are used to fill the unavailable sample. That is, the first four unavailable samples are filled with a value of "a", and the following 13 unavailable samples are filled using an average value of "b" and "c" or interpolation of "b" and "c".

Alternatively, the 13 unavailable samples may be replaced by an arbitrary value between sample values of available samples b and c. In this case, the unavailable samples may be replaced by different values. For example, the unavailable samples may be replaced by values getting closer to the value of the available sample a as getting closer to the available sample a. Similarly, the unavailable samples may be replaced by values getting closer to the value of the available sample b as getting closer to the available sample b. That is, on the basis of the distance from the unavailable sample to the available sample a and/or b, the value of the unavailable sample may be determined. In order to replace the unavailable sample, one or more of multiple methods including the above methods may be selectively applied.

A method of replacing the unavailable sample may be signaled by information included in the bitstream, or a method predetermined by the encoder and the decoder may be used. Alternatively, the method of replacing the unavailable sample may be derived by a predetermined method. For example, on the basis of the difference between the values of the available samples a and b and/or the number of unavailable samples, the method of replacing the unavailable sample may be selected. For example, on the basis of a comparison of the difference between the values of two available samples to a threshold value and/or a comparison of the number of unavailable samples with a threshold value, the method of replacing the unavailable sample may be selected. For example, when the difference of the values of two available samples is larger than the threshold value and/or when the number of unavailable samples is larger than the threshold value, the unavailable samples are replaced to have different values.

The selection of the method of replacing the unavailable sample may be performs in a predetermined unit. For example, the method of replacing the unavailable sample may be selected with respect to at least one unit among a video, a sequence, a picture, a slice, a tile, a coding tree unit, a coding unit, a prediction unit, and a transform unit. Here, the method of replacing the unavailable sample may be selected on the basis of information signaled in the predetermined unit or may be derived in the predetermined unit. Alternatively, the method predetermined by the encoder and the decoder may be applied.

When the reference sample corresponds to a predetermined position, padding is performed without determining availability of the block that includes the reference sample. For example, in FIG. 8, when the position of the top left corner sample of the current block is (0, 0), padding is performed without performing the determination of the availability with respect to the reference sample at the position wherein the x coordinate or the y coordinate is equal to or larger than W+H.

For example, without performing the determination of the availability with respect to the sample of ref[W+H, −2], padding may be performed with the value of ref[W+H−1, −2]. For example, without performing the determination of the availability with respect to the samples of ref[W+H, −3] and ref[W+H+1, −3], padding may be performed with the value of ref[W+H−1, −3]. That is, with respect to the sample of which the x coordinate or the y coordinate is equal to or larger than W+H, without performing the determination of the availability, padding may be performed using the closest sample on the same sample line.

As another example, when expressing the reference sample as a one-dimensional array, reference sample padding is performed as follows. For example, without performing the determination of the availability with respect to the reference sample of ref[2*W+1][−1], padding on ref[2*W+1][−1] may be performed with the value of ref[2*W][−1]. Also, without performing the determination of the availability with respect to the reference sample of ref[−1][2*H+1], padding on ref[−1][2*H+1] may be performed with the value of ref[−1][2*H]. That is, with respect to the sample of which the x coordinate or the y coordinate is equal to or larger than W or H, respectively, without performing the determination of the availability, padding may be performed using the closest sample on the same sample line.

Assuming that the position of the top left corner sample of the current block is (0, 0), the determination of the availability and padding may be performed with respect to, among the reference samples present at the top of the current block, the reference sample present at the position wherein the x coordinate is equal to or larger than W and is less than W+H. Further, among the reference samples present at the left of the current block, with respect to the reference sample present at the position wherein the y coordinate is equal to or larger than H and is less than W+H, the determination of the availability and padding may be performed.

For example, assuming that the position of the top left corner sample of the current block is (0, 0), the determination of the availability and padding may be performed with respect to the reference sample that corresponds to rec[x, −1] (x=−1~W+H−1) and/or rec[−1, y] (y=0~H+W−1).

In performing the padding, multiple reference sample lines may be used. For example, when padding is performed on a first reference sample line adjacent to the current block, a second reference sample line adjacent thereto is used. For example, reference sample padding may be performed using Equation 4 below. That is, the sample value of the first reference sample line may be derived using the weighted average of the multiple sample values selected from the first reconstruction sample line and the second reconstruction sample line. Here, the selected reconstruction samples may be samples at the position of the current sample and/or at the position adjacent to the current sample.

$$\text{ref}[x,-1]=(\text{rec}[x,-2]+3*\text{rec}[x,-1]+2)>>2$$
$$(x=W\sim H+W-1)$$ [Equation 4]

As describe above, filtering may be performed on one or more constructed reference samples.

Filtering on the reference sample may be adaptively performed on the basis of at least one among the intra prediction mode of the current block, the size of the current block, and the shape of the current block. For example, at least one among whether to apply filtering, the filter type, the filter strength, and the filter coefficient may be adaptively determined according to at least one among the intra prediction mode of the current block, the size of the current block, and the shape of the current block.

More specifically, whether to perform filtering on the reference sample may be determined according to the ratio of the horizontal and vertical lengths of the current block in which intra prediction is performed.

For example, when the horizontal length of the current block is longer than the vertical length, filtering on the reference sample is performed.

Here, when an intra prediction mode value for the current block is equal to or larger than a preset value, filtering on the reference sample is performed. For example, the preset value may be two.

Further, in the case where the horizontal length of the current block exceeds a multiple of a preset value of the vertical length, only when the intra prediction mode value for the current block is smaller than a first value, filtering on the reference sample is performed. Conversely, in the case where the horizontal length of the current block does not exceed the multiple of the preset value of the vertical length, only when the intra prediction mode value for the current block is smaller than a second value, filtering on the reference sample is performed. For example, a multiple of the preset value may be two. The first value and the second value may be eight and 12, respectively.

As another example, when the vertical length of the current block is longer than the horizontal length, filtering is performed on the reference sample.

Further, when the intra prediction mode value for the current block is equal to or smaller than the preset value, filtering on the reference sample is performed. For example, the preset value may be 66.

Further, in the case where the horizontal length of the current block exceeds a preset multiple of the vertical length, only when the intra prediction mode value for the current block exceeds the first value, filtering on the reference sample is performed. Conversely, in the case where the horizontal length of the current block does not exceed the preset multiple of the vertical length, only when the intra prediction mode value for the current block exceeds the second value, filtering on the reference sample is performed. For example, a multiple of the preset value may be two. The first value and the second value may be 56 and 60, respectively.

For example, whether to apply filtering may vary with each of the multiple reference sample lines. For example, filtering may be applied to the first reference sample line adjacent to the current block, and filtering may not be applied to the second reference sample line. For example, with respect to the same reference sample, a value wherein filtering is applied may be used together with a value wherein filtering is not applied.

As another example, filtering may be applied to the first reference sample line adjacent to the current block, and filtering may not be applied to the remaining reference sample lines.

For example, according to at least one among the intra prediction mode of the current block, the size of the current block, and the shape of the current block, at least one among a 3-tap filter, a 5-tap filter, a 7-tap filter, and a N-tap filter is selected differently to apply filtering. Here, N may be a positive integer.

Figure 10:
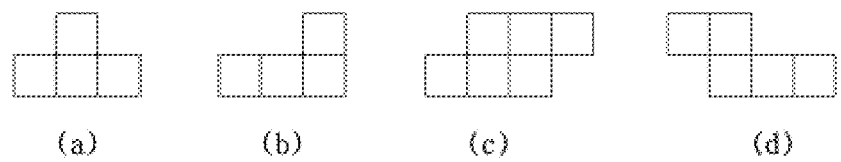
FIG. 10 is a diagram illustrating examples of several filter shapes used in an intra prediction method.

FIG. 10 is a diagram illustrating examples of several filter shapes used in an intra prediction method.

As another example, according to at least one among the intra prediction mode of the current block, the size of the current block, and the shape of the current block, the filter shapes to be applied may be selected differently. For example, at least one among the various filter shapes as shown in FIG. 10 may be selected.

The shape of the current block may be determined by comparing the horizontal length of the current block with the vertical length. For example, depending on whether the current block is in a horizontally long rectangular shape or in a vertically long rectangular shape, at least one among whether to apply the filter, the filter type, the filter strength, and the filter coefficient may be determined adaptively. Alternatively, depending on whether the current block is in a square shape or in a rectangular shape, at least one among whether to apply the filter, the filter type, the filter strength, and the filter coefficient may be determined adaptively.

Figure 11:
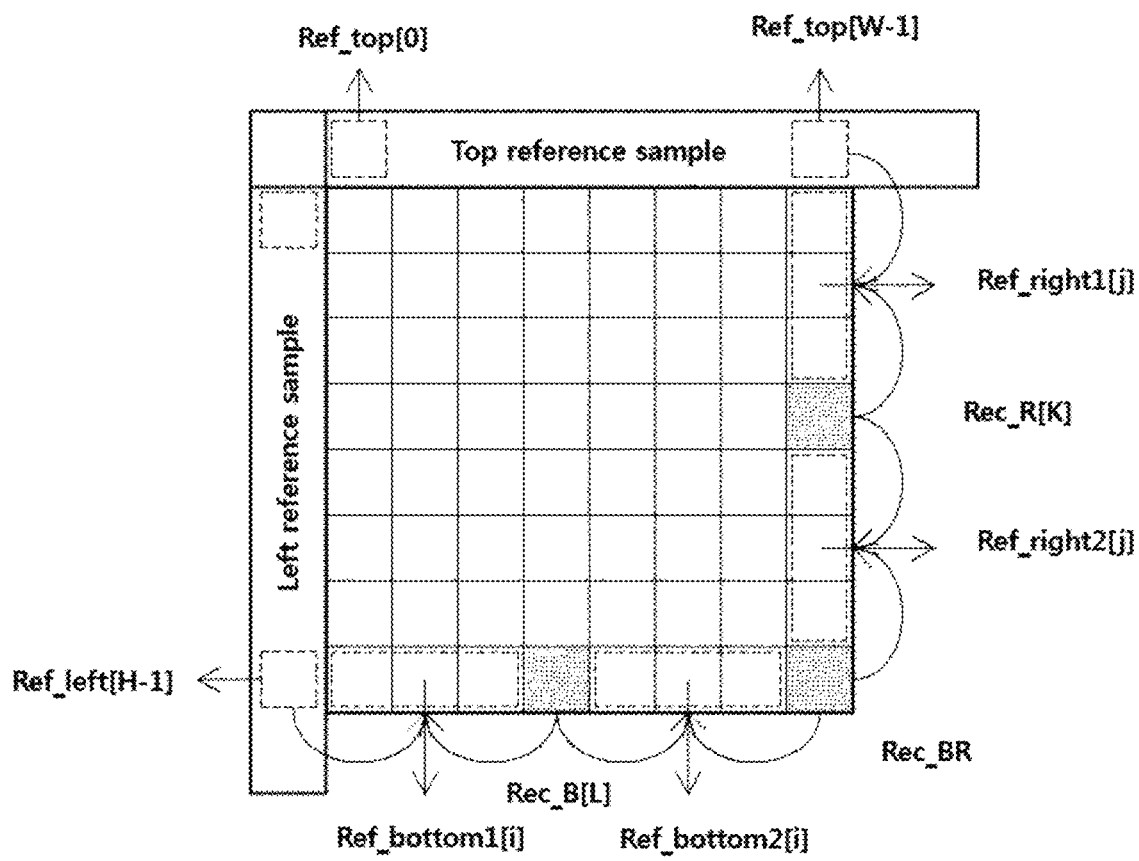
FIG. 11 is a diagram illustrating a method of constructing a reference sample according to the present invention.

FIG. 11 is a diagram illustrating a method of constructing a reference sample according to the present invention.

The method of constructing right and bottom reference samples of the current block will be described with reference to FIG. 11. For intra prediction according to the present invention, the decoder may construct the right and/or bottom reference sample in addition to the above-described reference samples.

The decoder may construct the right and bottom reference samples using the reconstructed original sample after decoding. The samples designated by Rec_R[K], Rec_B[L], and Rec_BR in FIG. 11 may be decoded original samples. Here, among the samples in the rightmost column and the bottommost row, the reference samples that are not included in Rec_R[K], Rec_B[L], and Rec_BR may be interpolated values by at least one among the following methods. Here, K and L may be positive integers that satisfy $0 \leq K \leq H-1$ and $0 \leq L \leq W-1$.

For example, the values of Rec_R[K], Rec_B[L], and Rec_BR in FIG. 11 may be used as the values of the reference samples at corresponding positions.

As another example, the value of Ref_right1[j] reference sample in FIG. 11 may be set to an interpolation value between values of Ref_top[W−1] and Rec_R[K] according to Equation 5 below. As another example, the value of Ref_right2[j] reference sample in FIG. 11 may be set to an interpolation value between values of Rec_R[K] and Rec_BR according to Equation 6 below. As another example, the value of Ref_bottom1[i] reference sample in FIG. 11 may be set to an interpolation value between values of Ref_left[H−1] and Rec_B[L] according to Equation 7 below. As another example, the value of Ref_bottom2[i] reference sample in FIG. 11 may be set to an interpolation value between values of Rec_B[L] and Rec_BR according to Equation 8 below. As another example, interpolation of values of respective reference samples may be performed according to one among linear interpolation and non-linear interpolation other than the above-mentioned method.

$Ref_{right1}[j]=w1*Ref_{top}[W-1]+w2*Rec_R[K]$, where $j=0$ to $K-1, w1+w2=1$ [Equation 5]

$Ref_{right2}[j]=w1*Rec_R[K]+w2*Rec_{BR}$, where $j=K+1$ to $H-1, w1+w2=1$ [Equation 6]

$Ref_{bottom1}[i]=w1*Ref_{left}[H-1]+w2*Rec_g[L]$, where $i=0$ to $L-1, w1+w2=1$ [Equation 7]

$Ref_{bottom2}[i]=w1*Rec_g[L]+w2*Rec_{BR}$, where $i=L+1$ to $W-1, w1+w2=1$ [Equation 8]

Particularly, when the current block is divided into multiple sub blocks, the decoder uses the interpolation method described above so as to interpolate the value of the right/bottom reference sample of each sub block. Also, the decoder may construct the value of the reference sample using different interpolation methods for respective sub blocks.

Hereinafter, a method of performing intra prediction on the current block by using the constructed reference sample will be described in detail.

The decoder may perform intra prediction on the current block on the basis of the derived intra prediction mode and the reference sample.

Non-directional intra prediction may be performed on the current block. A non-directional intra prediction mode may be, for example, at least one among a DC mode, a planar mode, and an LM mode.

In the case of the DC mode, prediction may be performed using an average value of one or more reference samples among the constructed reference samples. Here, filtering may be applied to one or more prediction samples that are positioned at the boundary of the current block. DC prediction may be adaptively performed on the basis of at least one among the size and the shape of the current block. Further, on the basis of at least one among the size and the shape of the current block, a range of reference samples used in the DC mode may be specified.

Figure 12:
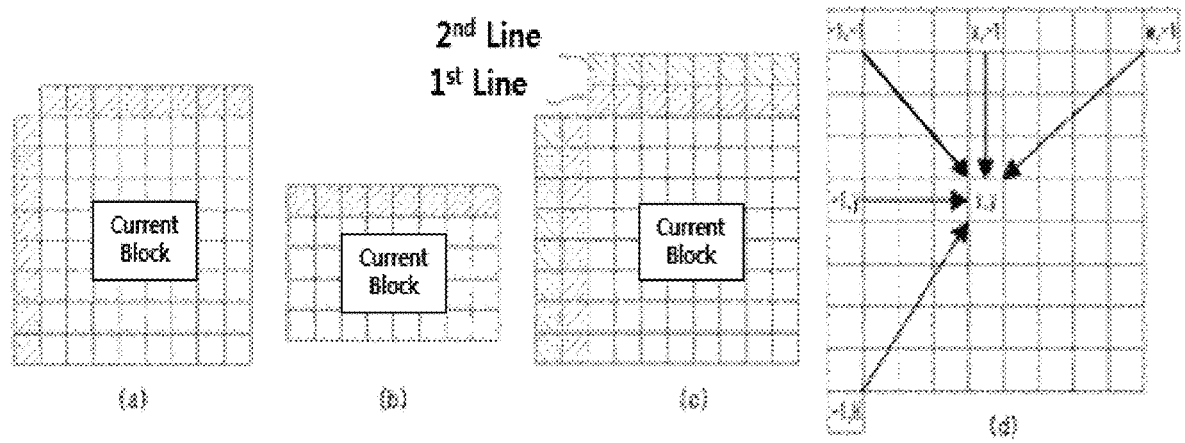
FIG. 12 is a diagram illustrating intra prediction according to a shape of a block.

FIG. 12 is a diagram illustrating intra prediction according to a shape of a block.

For example, when the shape of the current block is a square shape as shown in FIG. 12(a), DC prediction is performed using an average value of the top and left reference samples of the current block.

As another example, when the current block is in a non-square shape, neighboring samples adjacent to the left or the top of the current block are selectively used. When the shape of the current block is a rectangular shape as shown in FIG. 12(b), prediction is performed using an average value of reference samples adjacent to the longer one between the horizontal and vertical length of the current block.

As another example, when the size of the current block corresponds to a predetermined size or is included in a predetermined range, some samples are selected among the top or left reference samples of the current block, and an average value of the selected samples is used to perform DC prediction. The predetermined size may be a fixed size N×M that is pre-established in the encoder/decoder. Here, N and M may be integers larger than zero. N and M may be the same or different from each other. The predetermined range may mean a threshold value for selecting the reference sample of the current block. The threshold value may be implemented as at least one among the minimum value and the maximum value. The minimum value and/or the maximum value may be a fixed value pre-established in the encoder/decoder or may be a variable value encoded and signaled by the encoder.

As another example, DC prediction may be performed using one or more average values. When the current block is in a square shape or a non-square shape, at least one among a first average value wherein the top reference sample is used and a second average value wherein the left reference sample is used is used. A DC prediction value of the current block may be the first average value or the second average value. Alternatively, the DC prediction value of the current block may be a value obtained using a weighted sum of the first average value and the second average value. For example, the weighting factor for the first and second average values may be 1:1.

According to the above example, shift operation may be used to calculate all DC values. For example, the above example may be applied even when the width, the height of the current block, which are expressed as the sample length, or the sum of the width and height is not the square of two. The method may be applied to both luma DC prediction and chroma DC prediction. Alternatively, the method may be applied to only one among luma DC prediction and chroma DC prediction.

For example, when the current block is in a non-square shape, prediction is performed on the basis of one among the horizontal length and the vertical length. For example, the prediction value may be obtained by dividing the sum of the top reference sample and the left reference sample by a larger value between the horizontal length and the vertical length of the current block. Here, division using the value that corresponds to the larger one may be performed by shift operation.

For example, DC prediction may be performed using multiple reference sample lines. For example, as shown in FIG. 12(c), prediction may be performed using two reference sample lines.

For example, the average value of the reference samples included in the two reference sample lines may be determined as a DC prediction value of the current block.

Alternatively, different weighting factors may be applied to the reference sample in a first line adjacent to the current block and the reference sample in a second line. For example, a value (for example, a value of (3*the reference sample in the first line+the reference sample in the second line+2)>>2) may be obtained by applying a weighting factor of 3:1 to the value of the reference sample in the first line and the value of the reference sample in the second line, and the average value of these values may be determined as the DC prediction value of the current block. Alternatively, a value of (3*the reference sample in the first line−the reference sample in the second line)>>1 may be obtained, and the average value of these values may be determined as the DC prediction value of the current block. The weighting factor is not limited to the above example, and an arbitrary weighting factor is possible. Here, as the reference sample line is adjacent to the current block, the larger weighting factor may be applied. The number of reference sample lines that may be used is not limited to two, and three or more reference sample lines may be used.

In the case of the planar mode, prediction may be performed with a weighted sum considering the distance from one or more reference samples constructed according to the position of the intra prediction target sample of the current block.

Filtering may be performed on the reference sample or the prediction sample of the current block. For example, after applying filtering to the reference sample, planar prediction may be performed, and filtering may be performed on one or more prediction samples. A filtering target sample among the prediction samples may be one, two, or N lines of the top or left boundary within the current block.

In order to perform planar prediction, a weighted sum of one or more reference samples may be used. For example, as shown in FIG. 12(d), five reference samples may be used. For example, in order to predict a target sample at the position [x, y], reference samples r[−1, −1], r[x, −1], r[−1, y], r[W, −1], and r[−1, H] may be used. Here, W and H may be the horizontal length and the vertical length of the current block, respectively. For example, a prediction sample pred[x, y] may be generated using Equation 9 below.

In Equation 9 below, a, b, c, d, and e may denote weighting factors. N may be log 2(a+b+c+d+e).

$$pred[x,y]=(a*r[-1,-1]+b*r[x,-1]+c*r[-1,y]+d*r[W,-1]+e*r[-1,H])>>N \quad \text{[Equation 9]}$$

As another example, planar prediction may be performed using multiple reference sample lines. For example, prediction may be performed using a weighted sum of two reference sample lines. For example, the weighted sum of the reference samples included in the two reference sample lines may be used. In this case, a reference sample adjacent to the reference sample selected from the first reference sample line may be selected from the second reference sample line. With respect to the reference sample at coordinates (−1, −1), the reference sample at coordinates (−2, −2) may be selected. As the weighted sum of the selected reference samples, planar prediction may be performed, and the weighting factor is as described in DC prediction.

Directional intra prediction may be performed on the current block. The directional intra prediction mode may be at least one among, for example, the horizontal mode, the vertical mode, and the mode with a predetermined angle.

In the horizontal/vertical mode, prediction may be performed using one or more reference samples that are present on the horizontal/vertical line from the position of the intra prediction target sample.

Regarding a mode having a predetermined angle, prediction may be performed using one or more reference samples that are present on and near a line at a predetermined angle from the position of the intra prediction target sample. Here, the number of reference samples to be used is N which is at least one of two, three, four, five, and six.

According to the reference samples, a N-tap filter may be used to perform prediction. For example, prediction may be performed applying at least one among 2-tap, 3-tap, 4-tap, 5-tap, and 6-tap filters. Here, at least one of the reference samples may be positioned at the top of the current block, and the remaining things may be positioned at the left of the current block. The reference samples positioned at the top of the current block or the reference samples positioned at the left may be positioned on the same line or may be positioned on the different lines.

Intra prediction based on position information may be performed on the current block. Here, the position information may be encoded/decoded, and the reconstructed sample block at the position may be derived into the intra prediction block of the current block. Alternatively, a block found by the decoder by searching for the block similar to the current block may be derived into the intra prediction block of the current block.

Intra prediction between color components for the current block may be performed. For example, a reconstructed luma component of the current block may be used to perform intra prediction on the chroma component. Further, one reconstructed chroma component Cb of the current block may be used to perform intra prediction on another chroma component Cr.

Hereinafter, in performing intra prediction by the decoder, a method of performing interpolation prediction by using one or more reference samples will be described.

In performing intra prediction, the decoder may perform prediction using at least one among the number of reference sample lines, the number of interpolation filter taps, the coefficient value of the interpolation filter, filtering application, a weighted average method differently on the basis of at least one among the intra prediction mode of the current block and the size/shape of the current block.

Figure 13:
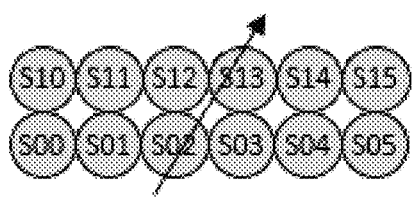
FIG. 13 is a diagram illustrating a method of using two reference samples in an intra prediction method.

FIG. 13 is a diagram illustrating a method of using two reference samples in an intra prediction method.

The number of reference sample lines to be used may vary according to the intra prediction mode of the current block. For example, when the intra prediction mode of the current block is a non-directional mode, such as DC or planar mode, one reference sample line is used. When it is a directional mode, two reference sample lines are used.

The number of reference sample lines to be used may vary according to the size/shape of the current block. For example, when the size of the current block is smaller than a predetermined size, one reference sample line is used. When it is larger than the predetermined size, two reference sample lines are used.

The number of reference sample lines to be used may be set differently when the boundary of the current block corresponds to a predetermined boundary. For example, when the top boundary of the current block corresponds to at least one among the boundaries of the picture, the slice, the tile, the coding tree block (CTB), and a predetermined-size block, one reference sample line is used for the top. As another example, when the left boundary of the current block corresponds to at least one among the boundaries of the picture, the slice, the tile, the coding tree block (CTB), and the predetermined-size block, one reference sample line is used for the left.

As another example, the number of available reference sample lines may be set differently when the boundary of the current block corresponds to a predetermined boundary. That is, according to whether the boundary of the current block corresponds to the predetermined boundary, the number of available sample lines may vary.

For example, when the top boundary of the current block corresponds to at least one among the boundaries of the picture, the slice, the tile, the coding tree block (CTB), and the predetermined-size block, the indicator value for the reference sample is always set to a preset value. Here, there is one available reference sample line.

On the other hand, when the top boundary of the current block does not correspond to at least one among the boundaries of the picture, the slice, the tile, the coding tree block (CTB), and the predetermined-size block, the number of available reference sample lines that may be selected as reference sample lines are three.

In performing directional prediction, an interpolation filter may be applied. The interpolation filter may have at least one tap number among two taps, four taps, six taps, and N taps, and N is a positive integer. The interpolation filter may have one or more filter coefficient values per tap.

For example, a 6-tap filter may be applied as shown in Equation 10 below. Here, a to f may be filter coefficients of the 6-tap filter. S00 to S05 may denote samples, respectively, shown in FIG. 13.

$$S\_F=(a*S00+b*S01+c*S02+d*S03+e*S04+f*S05+2^{g-1})>>g \quad \text{[Equation 10]}$$

The sum of the filter coefficients may be at least one among 32, 64, 128, 256, 512, 1024, and N, and each filter coefficient may be an integer value. The g value may be a value corresponding to two to the power g with respect to the sum of the filter coefficients. For example, when the sum of the filter coefficients is 1024, g is 10.

According to the intra prediction mode, the interpolation filter tap or the coefficient value may vary.

For example, when the intra prediction mode does not correspond to a predetermined mode, the 4-tap filter is applied. When it does not correspond to the predetermined mode, the 2-tap filter is applied.

As another example, the filter coefficient value may vary on the basis of the angle according to the intra prediction mode. For example, in the case of the 6-tap, two filter types may be used. Here, the used filters may be referred to as a first filter and a second filter. Each filter may have filter coefficient values {a, b, c, d, e, f}, and here, the filter coefficient values may be stored in a look-up table (LUT) form. Table 1 below shows examples of filter coefficient values of the first filter and the second filter according to the position between integer unit samples. In the table below, X-pel may denote the position between c and d determined according to the intra prediction mode.

TABLE 1

| Angle | 6-tap Filter1 | 6-tap Filter2 |
|---|---|---|
| 0-pel | {0, 256, 512, 256, 0, 0} | {47, 255, 416, 256, 49, 1} |
| 1/32-pel | {−3, 246, 509, 267, 6, −1} | {43, 247, 416, 264, 53, 1} |
| 2/32-pel | {−5, 237, 506, 278, 11, −3} | {40, 240, 414, 270, 58, 2} |
| 3/32-pel | {−7, 228, 502, 288, 17, −4} | {37, 233, 413, 277, 62, 2} |
| 4/32-pel | {−9, 218, 497, 299, 24, −5} | {34, 226, 412, 284, 66, 2} |
| 5/32-pel | {−10, 210, 493, 309, 29, −7} | {31, 218, 410, 292, 71, 2} |
| 6/32-pel | {−12, 200, 488, 320, 36, −8} | {28, 210, 407, 299, 77, 3} |
| 7/32-pel | {−13, 191, 482, 330, 43, −9} | {26, 203, 404, 306, 82, 3} |
| 8/32-pel | {−14, 182, 476, 340, 50, −10} | {23, 195, 401, 313, 88, 4} |
| 9/32-pel | {−15, 173, 470, 350, 57, −11} | {21, 188, 398, 320, 93, 4} |
| 10/32-pel | {−16, 163, 463, 361, 65, −12} | {19, 180, 393, 327, 100, 5} |
| 11/32-pel | {−16, 155, 456, 370, 72, −13} | {17, 173, 389, 333, 106, 6} |
| 12/32-pel | {−16, 147, 449, 379, 79, −14} | {16, 167, 385, 339, 111, 6} |
| 13/32-pel | {−16, 138, 440, 388, 88, −14} | {14, 159, 380, 346, 118, 7} |
| 14/32-pel | {−17, 128, 433, 399, 96, −15} | {13, 153, 375, 351, 124, 8} |
| 15/32-pel | {−16, 121, 425, 407, 103, −16} | {11, 145, 370, 358, 131, 9} |
| 16/32-pel | {−16, 112, 416, 416, 112, −16} | {10, 138, 364, 364, 138, 10} |

According to the size/shape of the current block, interpolation filter tap or the coefficient value to be used may vary.

For example, when the horizontal or vertical size of the current block corresponds to a predetermined size, a 2-tap filter is applied. When corresponding to another predetermined size, a 6-tap filter is applied.

As another example, when the horizontal or vertical size of the current block corresponds to a predetermined size, a first 6-tap filter is applied. When corresponding to another predetermined size, a second 6-tap filter is applied. For example, when the horizontal or vertical size of the current block corresponding to the reference sample region that the directional prediction mode uses is equal to or smaller than a value of eight, the first 6-tap filter is applied. When being larger than a value of eight, the second 6-tap filter is applied.

As another example, according to the horizontal or vertical size of the current block, the filter coefficient value may be adaptively selected for application.

For intra prediction of the current block, when multiple reference sample lines are used, the interpolation filter tap or the coefficient value to be used is set differently according to the reference sample line.

For example, when the reference sample line corresponds to the first line adjacent to the current block, the 6-tap filter is applied. When it corresponds to the second line, the 2-tap filter is applied. As shown in FIG. 13, when directional prediction is performed on the current block, a 6-tap interpolation filter operates using the samples S00 to S05 that are present in the first line, and a 2-tap interpolation filter operates using the samples S12 to S13 that are present in the second line.

The interpolation filter may be in a two-dimensional shape. For example, the N-tap filter provided in the filter shape shown in FIG. 10 may be applied in various ways.

In performing directional prediction on the current block, the decoder may use a reference sample to which an interpolation filter is not applied. For example, in performing intra prediction on the sample of the current block, when the reference sample corresponding to the directional mode is present at the integer position, the decoder uses the reference sample as it is without applying the interpolation filter.

With respect to the reference sample to which the interpolation filter is not applied, at least one filter among 3-tap, 5-tap, and N-tap filters may be applied. For example, a filter {1, 2, 1} may be applied to the reference sample. Here, whether to apply the filter may be determined on the basis of at least one among the intra prediction mode, the size, and the shape of the current block.

For example, when multiple reference sample lines are used for intra prediction, the interpolation filter or the weighted average is applied to a value predicted applying the interpolation filter in each reference sample line. The prediction value may be derived according to Equation 11 below.

$$S\_P = (h*S\_F1 + i*S\_F2 + 2j-1) >> j \quad \text{[Equation 11]}$$

For example, the decoder may derive the prediction value S_P using a weighted average of S_F1, which is derived by applying the interpolation filter to the first reference sample line, and S_F2, which is derived by applying the interpolation filter to the second reference sample line. Here, h and i may be weighting factor values, and j may be a value corresponding to two to the power j with respect to the sum of weighting factor values. For example, h=3, i=1, and j=2 are possible.

In applying the interpolation filter, padding is performed when a sample outside the constructed reference sample region is used. For example, when the directional prediction mode passes between the reference samples S04 and S05 shown in FIG. 13, the 6-tap filter is applied to the reference sample, and the decoder applies the interpolation filter after two samples out of the right are subjected to padding with the available reference sample S05.

Figure 14:
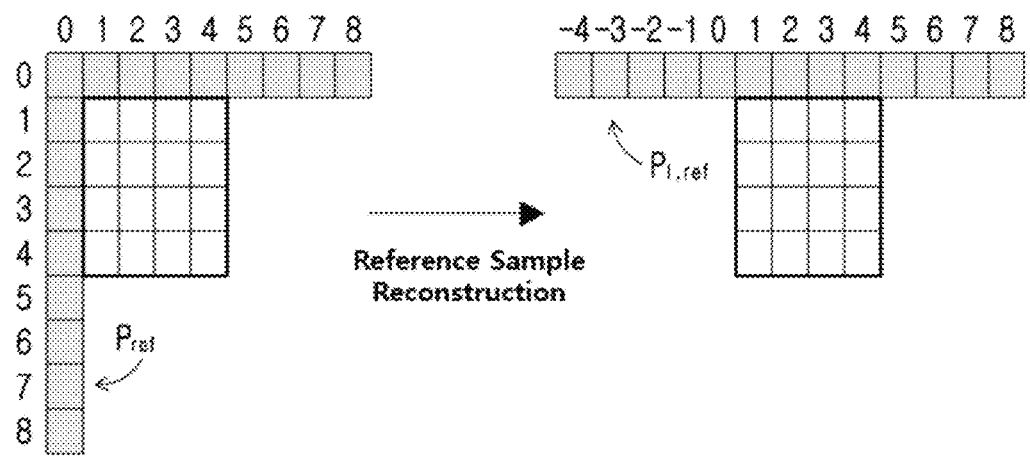
FIG. 14 is a diagram illustrating a method of reconstructing a reference sample.

FIG. 14 is a diagram illustrating a method of reconstructing a reference sample.

In performing directional intra prediction, the constructed reference sample is constructed again according to the directional prediction mode. For example, when the directional prediction mode is a mode wherein all reference samples present at the left and the top are used, one-dimensional array for the left or the top is constructed again using the left and/or top reference sample.

For example, as shown in FIG. 14, one-dimensional array for the top reference sample may be constructed using one or more among the reference samples present on the left. Here, the sample, among the left reference samples, used to construct the top reference sample may vary according to the directional mode. According to FIG. 14, the top reference sample may be constructed again by shifting the left reference sample. As another example, the top reference sample may be constructed again using interpolation of one or more left reference samples.

Hereinafter, a method of performing intra prediction on the current block by using reference samples that include decoded right and/or bottom original samples will be described in detail.

Figure 15:
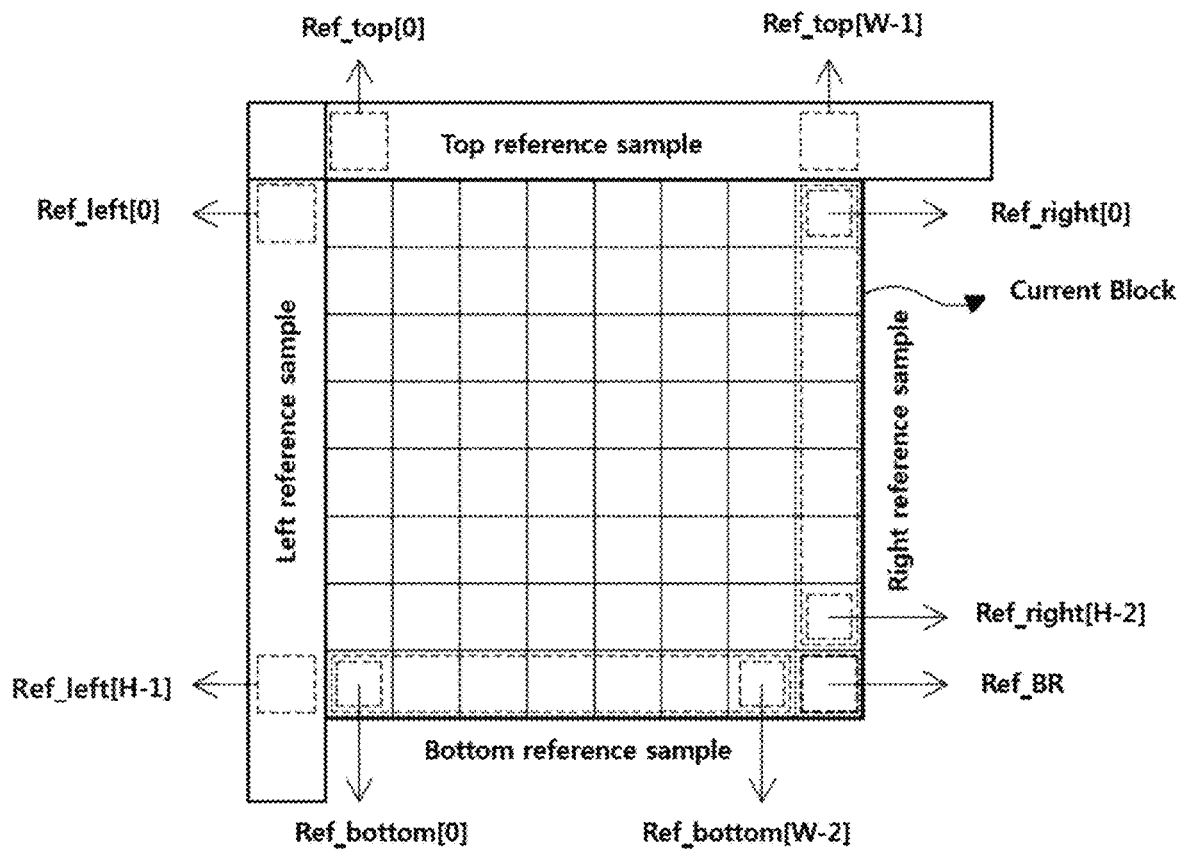
FIG. 15 is a diagram illustrating an example of an intra prediction method in a DC mode according to the present invention.

FIG. 15 is a diagram illustrating an example of an intra prediction method in a DC mode according to the present invention.

When non-directional intra prediction is performed using reference samples that include the right and/or bottom original samples, the non-directional intra prediction mode is at least one among the DC mode and the planar mode.

As shown in FIG. 15, when the horizontal length of the current block is W and the vertical length is H, DC mode prediction is performed according to Equation 12 below. DC mode prediction of the current block may be performed using an average value of one or more reference samples among top and left reference samples, which consist of adjacent reconstruction samples and/or right and bottom reference samples, which is constructed by original sample decoding and interpolation. The term, average (•) below may be an operator for obtaining the average of integers.

$$DC = \text{average}\left[w1 * \sum_{i=0}^{W-1} Ref_{top}[i] + w2 * \sum_{i=0}^{R-1} Ref_{left}[i] + \right. \quad \text{[Equation 12]}$$
$$\left. e3 * \sum_{i=0}^{W-2} Ref_{bottom}[i] + w4 * \sum_{i=0}^{R-2} Ref_{right}[i] + w5 * Ref_{RB}\right]$$

The DC mode prediction method according to the present invention may be performed on the basis of at least one among the size and the shape of the current block according to at least one of the following examples.

For example, in Equation 12, w1=w2=w3=w4=w5 is possible. As another example, in Equation 12, w1, w2, w3, w4, and w5 may have different values. As still another example, in Equation 12, w3=w4=w5=0 is possible. As still another example, in Equation 12, w1=w2 and w3=w4=w5 is possible. However, w1>w3 is possible. As still another example, when the current block is a non-square block with W>H, in Equation 12, w1=w3=w5 and w2=w4 are possible. However, w1>w2 is possible. As still another example, when the current block is a non-square block with W>H, in Equation 12, w2=w4=0 is possible. As still another example, when the current block is a non-square block with W<H, in Equation 12, w1=w3 and w2=w4=w5 are possible. However, w1<w2 is possible. As still another example, when the current block is a non-square block with W<H, in Equation 12, w1=w3=0 is possible.

In the planar mode, prediction may be performed using a weighted sum considering the distance from one or more reference samples among the top reference samples, the left reference samples, the bottom reference samples, and the right reference samples that are constructed according to the position (x, y) of the intra prediction target sample of the current block.

For example, as shown in FIG. 15, when the horizontal length of the current block is W and the vertical length is H, planar mode prediction is performed according to Equation 13 below. Regarding the pixel values at positions of the respective pixels that constitute the prediction block, planar mode prediction may be performed using the weighted sum of the values of the top reference pixels, the left reference pixels, the bottom reference pixels, and the right reference pixels. Here, prediction sample values of the rightmost column and/or the bottommost row of the current block may be may be respectively constructed with right and/or bottom reference sample values that consist of decoded values of the original samples and interpolated values.

$$Pred_c(x, y) = \hspace{4cm} \text{[Equation 13]}$$
$$\frac{y+1}{W+H} * Ref_{bottom}[x] + \frac{W-1-x}{W+H} * Ref_{left}[y] +$$
$$\frac{H-1-y}{W+H} * Ref_{top}[x] + \frac{x+1}{W+H} * Ref_{right}[y]$$
where $x = 0, ... W-2$ & $y = 0 ... H-2$
$$Pred_c(x, y) = Ref_{right}[y],$$
where $x = W-1$ & $y = 0, ... H-2$
$$Pred_c(x, y) = Ref_{right}[x], \text{ where } x = 0,$$
$$... H-2 \text{ & } y = W-2$$
$$Pred_c(x, y) = Ref_{RB}, \text{ where } x = H-2 \text{ & } y = W-2$$

Figure 16:
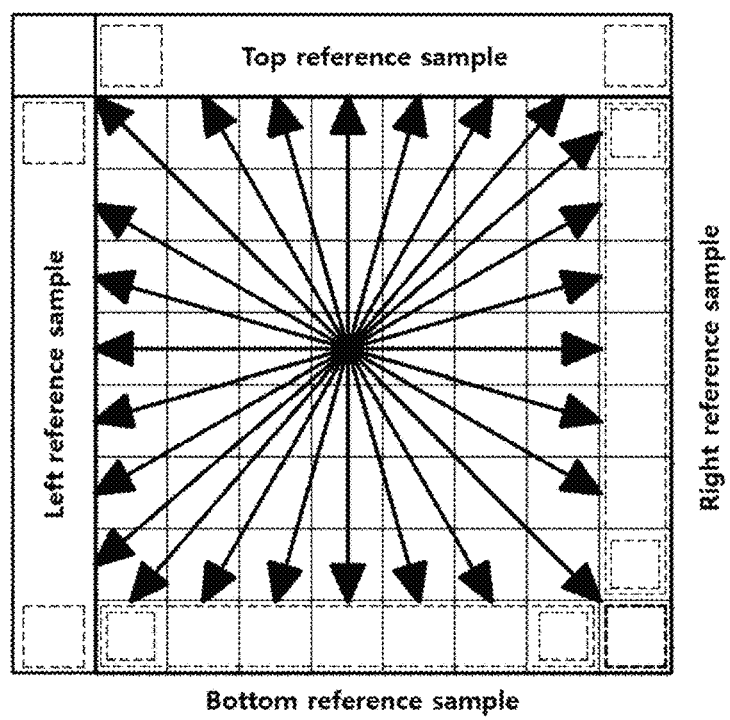
FIGS. 16 to 18 are diagrams illustrating examples of an intra prediction method in a directional mode according to the present invention.
Figure 17:
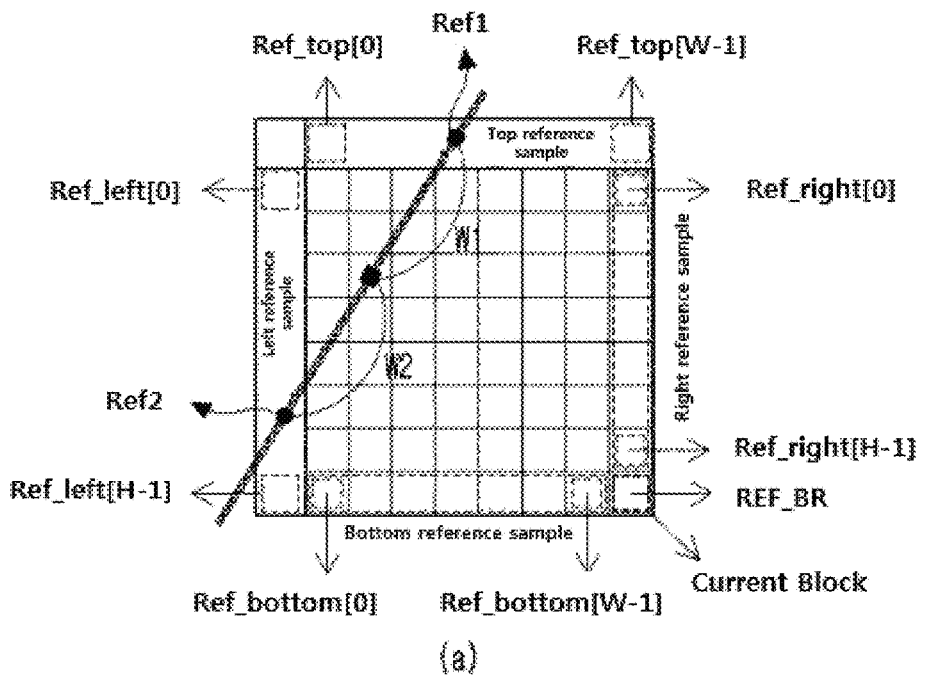
Figure 17:
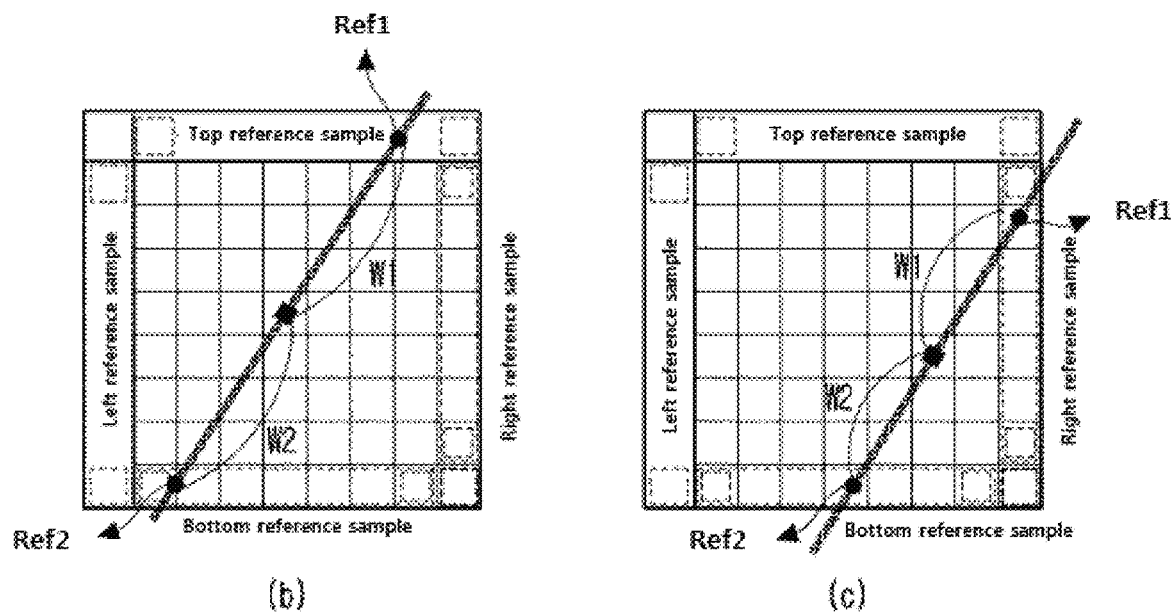
Figure 18:
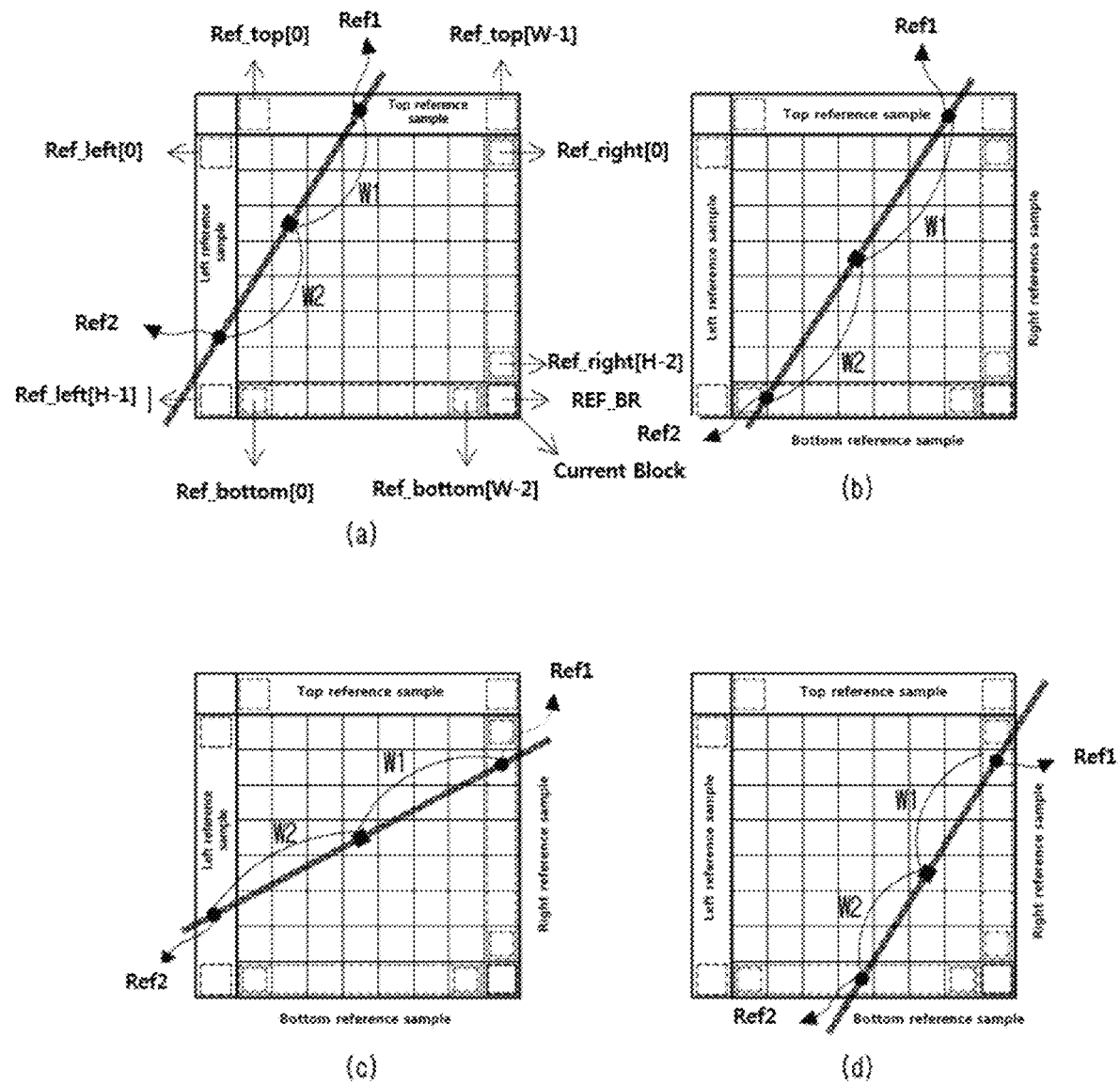

FIGS. 16 to 18 are diagrams illustrating examples of an intra prediction method in a directional mode according to the present invention.

When performing directional intra prediction using the reference samples that include the right and/or bottom original samples, the directional prediction mode may be at least one among the horizontal mode, the vertical mode, and a mode having a predetermined angle.

When performing directional intra prediction using the reference samples that include the right and/or bottom original samples, bi-directional prediction is performed using values of the two reference samples at opposite ends in each direction. Here, the angle of directional prediction may mean all directions within 360° as shown in FIG. 16. The number of bi-directional prediction modes may be N, and N may mean a positive integer.

Here, with the right and/or bottom reference sample values that consist of the decoded values of the original samples and the interpolated values, prediction sample values of the rightmost column of the current block and prediction sample value of the bottommost row of the current block may be constructed first, respectively.

In FIGS. 17(*a*) to 17(*c*), the sample designated by a rhombus may be a prediction target sample Pred(x,y) at a particular position, and the samples designated by circles may mean reference samples Ref1 and Ref2 used to predict the prediction target sample. Here, each of Ref1 and Ref2 may be one of the top, left, right, or bottom reference samples. FIG. 17(*a*) shows a case in which reference samples for the prediction target sample are left and top reference samples. FIG. 17(*b*) shows a case in which reference samples for the prediction target sample are bottom and top reference samples. FIG. 17(*c*) shows a case in which reference samples for the prediction target sample are bottom and right reference samples.

Further, in FIGS. 17(*a*) to 17(*c*), W1 and W2 may mean the distances to the reference samples Ref1 and Ref2 used in bi-directional prediction, respectively.

Here, when the position of the reference sample is not an integer, the reference sample value is configured with the interpolated values of the reference sample values at multiple adjacent integer positions. For example, when Ref1 is present between Ref_top[x] and Ref_top[x+1] (wherein, x=0, . . . , W−2), W1 is calculated using the reference sample Ref_top[k] at the integer position which is closer to Ref1, among reference samples at two integer positions. Further, when Ref2 is present between Ref_left[y] and Ref_left[y+1] (wherein, y=0, . . . , H−2), the distance is calculated using the reference sample Ref_left[1] at the integer position which is closer to Ref2, among reference sample at two integer positions.

In the same manner, when the reference sample for the prediction target sample is the bottom and/or right reference sample, the bottom and/or right reference sample at the integer position is obtained by the same method as described above, and on the basis of this, the distance between the prediction target sample and the reference sample is obtained. Specifically, W1 and W2 may be obtained by the following methods.

For example, the distance W1 between Pred(x,y) and Ref1 may be obtained by sqrt{(x−k)2+(y+1)2}. As another example, the distance W1 between Pred(x,y) and Ref1 may be obtained by abs(x−k)+(y+1). As another example, the distance W1 between Pred(x,y) and Ref1 may be obtained by max{abs(x−k), (y+1)}. As another example, the distance W2 between Pred(x,y) and Ref2 may be obtained by sqrt{(x+1)2+(y−1)2}. As another example, the distance W2 between Pred(x,y) and Ref2 may be obtained by (x+1)+abs (y−1). As another example, the distance W2 between Pred (x,y) and Ref2 may be obtained by max{(x+1), abs(y−1)}.

In the directional mode, bi-directional prediction may be performed as Equation 14 below.

$$Pred_c(x, y) = \hspace{4cm} \text{[Equation 14]}$$
$$\frac{(w_{ref1} + w_{ref1\_type}) \cdot Ref1 + (w_{ref2} + w_{ref2\_type}) \cdot Ref2 + (w1 + w2 + w_{ref1\_type} + w_{ref2\_type}) >> 1}{w1 + w2 + w_{ref1\_type} + w_{ref2\_type}}$$

For example, w_ref1 and w_ref2 may be weighting factors that are proportional to the distance (W1) between the prediction sample and Ref1 and to the distance (W2) between the prediction sample and Ref2, respectively.

As another example, w_ref1 and w_ref2 may be weighting factors that are inversely proportional to the distance between the prediction sample and Ref1 and to the distance between the prediction sample and Ref2, respectively.

Further, w_ref1 type and w_ref2_type may be weighting factors that are related to whether Ref1 or Ref2 is the reference sample positioned at the top/left reference sample consisting of the reconstructed sample or is the reference sample positioned at the bottom/right reference sample constructed by interpolation. Here, w_ref1, w_ref2, w_ref1_type, and w_ref2_type may be obtained by one or more of the following methods.

For example, w_ref1=w_ref2=w_ref1_type w_ref2_ type=C is possible, and C may be an arbitrary constant.

As another example, w_ref1=W1, w_ref2=W2, and w_ref1_type=w_ref2_type=C are possible. Here, C may be an arbitrary constant, for example, C=0 is possible.

As another example, w_ref1=W2, w_ref2=W1, and w_ref1_type=w_ref2_type=C are possible. Here, C may be an arbitrary constant, for example, C=0 is possible.

As another example, as shown in FIG. 18(*a*), when both Ref1 and Ref2 are present in the top or left reference sample region, w_ref1_type=w_ref2_type=C1 is possible, and w_ref1 and w_ref2 are w_ref1=W1 and w_ref2=W2, respectively, or w_ref1=w_ref2=C2 is possible. Here, C1 and C2 may be arbitrary constants.

As another example, as shown in FIG. 18(b), when Ref1 is present in the top or left reference sample region and Ref2 is present in the right or bottom reference sample region, w_ref1_type>w_ref2_type is possible, w_ref1 and w_ref2 are w_ref1=W1 and w_ref2=W2, respectively, or w_ref1=w_ref2=C is possible. Here, C may be an arbitrary constant.

As another example, as shown in FIG. 18(c), when Ref2 is present in the top or left reference sample region and Ref1 is present in the right or bottom reference sample region, w_ref1_type<w_ref2_type is possible, w_ref1 and w_ref2 are w_ref1=W1 and w_ref2=W2, respectively, or wref1=w2ref2=C is possible. Here, C may be an arbitrary constant.

As another example, as shown in FIG. 18(d), when both Ref1 and Ref2 are present in the bottom or right reference sample region, w_ref1_type=w_ref2_type=C1 is possible, w_ref1 and w_ref2 are wref1=W1 and w_ref2=W2, respectively, or w_ref1=w_ref2=C2 is possible. Here, C1 and C2 may be arbitrary constants.

Hereinafter, a method of performing, by the decoding apparatus, intra prediction by using an overlay predictor for the current block will be described.

Figure 19:
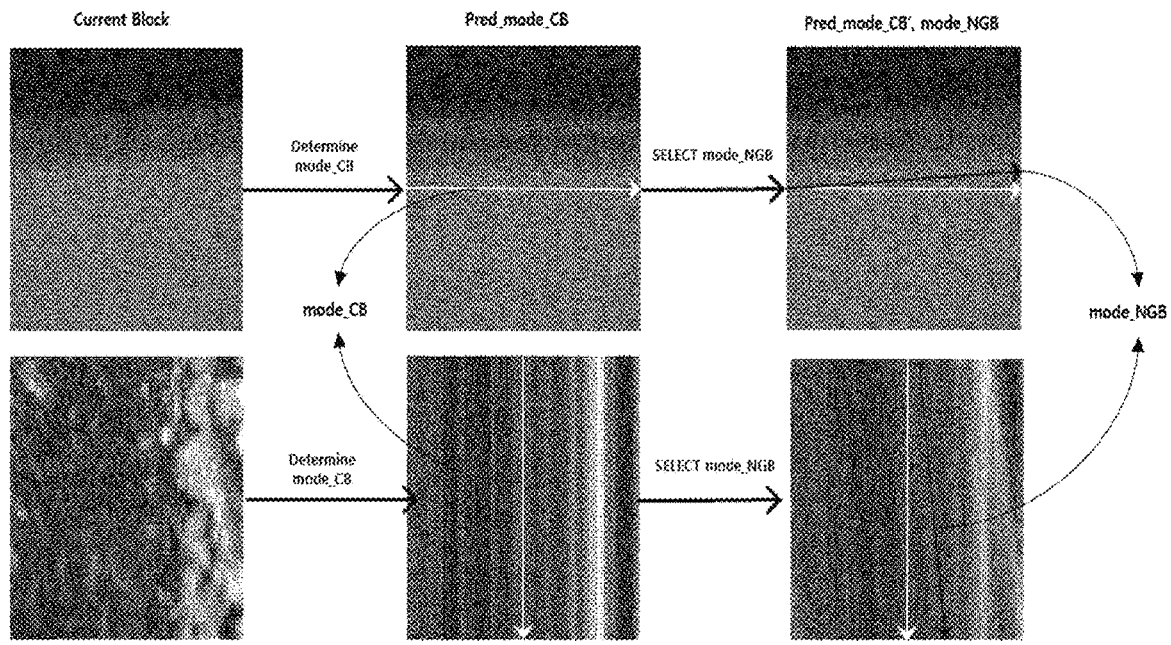
FIG. 19 is a diagram illustrating an example of an intra prediction method using an overlay predictor.

FIG. 19 is a diagram illustrating an example of an intra prediction method using an overlay predictor.

The decoder may perform intra prediction on the current block by using the overlay predictor. When the current block is predicted using N intra prediction modes, the intra prediction mode mode_CB of the current block is one of the following.

For example, mode_CB may be determined to be one of N intra prediction modes. Specifically, mode_CB may be determined as a mode that has the lowest cost in terms of a cost function considering at least one among a residual signal between the current block and the predictor generated in each intra prediction mode of the N intra prediction modes, and the amount of information required to transmit the residual signal.

K modes adjacent to Mode_CB may be defined as adjacent modes mode_NGB of mode_CB. Here, K adjacent modes may mean one or more among mode_CB+1 to mode_CB+K1 and mode_CB−1 to mode_CB−K2. Here, K1 and K2 may be positive integers, K1+K2=K is possible.

The overlay predictor Pred_combined may be derived according to Equation 15 below. Specifically, the overlay predictor may be derived by a weighted sum of a predictor Pred_mode_CB generated using mode_CB and a predictor Pred_mode_NGB generated using mode_NGB.

$$Pred_{combined} = w1 \cdot Pred_{mode_{CB}} + w2 \cdot Pred_{mode_{NGB}}$$ [Equation 15]

FIG. 19 shows some examples in which intra prediction is performed using the overlay predictor. The decoder may determine mode_CB and mode_NGB with respect to the current block, and on the basis of this, Pred_mode_CB and Pred_mode_NGB may be derived. The decoder may derive Pred_combined using the weighted sum of derived Pred_mode_CB and Pred_mode_NGB. Here, the weighting factors w1 and w2 may satisfy the condition of w1+w2=1.

When performing intra prediction using the overlay predictor, it is possible to signal an overlay predictor flag (flag_combined) and/or an indicator that indicates that which mode_NGB among the multiple adjacent modes is used to construct Pred_combined.

When the cost between the current block and the predictor (Pred_mode_CB) of the current block is defined as cost_CB, and the cost between the current block and the overlay predictor (Pred_combined) is defined as cost_combined, the decoder compares cost_CB with cost_combined.

Here, in the K adjacent modes (mode_NGB index, wherein, index=0, . . . , K−1), cost_CB may be compared with cost_combined of mode_NBG_index, which has the smallest value among cost_combineds when using each mode_NBG_index.

For example, in the case of cost_CB>cost_combined, prediction is performed using Pred_combined, and flag_combined and index information are signaled. Here, a value of flag_combined may be a first value. On the other hand, in the case of cost_CB≤cost_combined index, prediction may be performed using mode_CB and flag_combined may be transmitted. Here, a value of flag_combined may be a second value. Here, the first value and the second value may be respectively zero and one, or one and zero. The index information may be entropy encoded/decoded by the encoder and the decoder.

Figure 20:
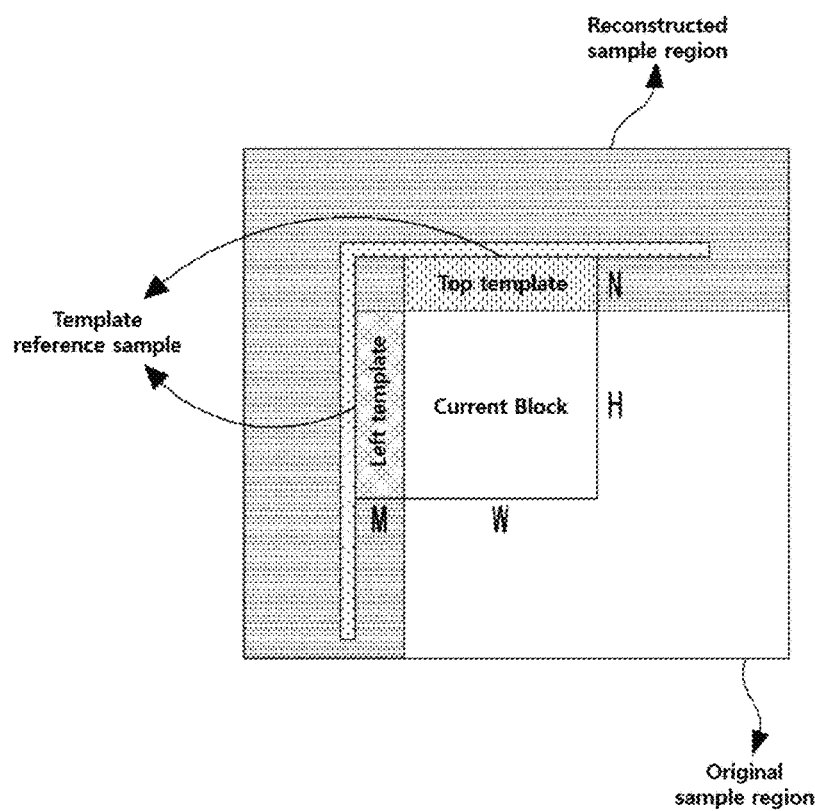
FIG. 20 is a diagram illustrating a template used in an intra prediction method using an overlay predictor.

FIG. 20 is a diagram illustrating a template used in an intra prediction method using an overlay predictor.

As another example of performing intra prediction using the overlay predictor, the encoder may transmit the overlay predictor flag (flag_combined), and the indicator (index) may be derived by the decoder.

Here, in order to determine the value of flag_combined, the encoder may designate the reconstruction pixel region adjacent to the current block as a template and may use a cost function or a cost value between the template and the reconstruction region. For example, the cost function or the cost may be one among SAD, SSE, SAID, MSE, and the like.

For example, with respect to the current block in the size of W×H as shown in FIG. 20, templates may be N rows adjacent to the topmost row of the current block and M columns adjacent to the leftmost column of the current block. Here, the N rows and the M columns may be defined as a top template and a left template, respectively. Here, N and M may be values varying with W and H. Specifically, N and/or M may be determined according to the following methods.

For example, N and/or M may be a predetermined positive integer that is determined regardless of the value of W and/or H. As another example, in the case of W=H, N and M may be positive integers that satisfy N=M. As still another example, in the case of W>H, N and M may be positive integers that satisfy N<M. As still another example, in the case of W<H, N and M may be positive integers that satisfy N>M.

The term, cost_TMP_CB between the template reference sample shown in FIG. 20 and the reconstruction sample of the region such as a predictor (Pred_TMP) that is constructed in the template region by using mode_CB may be calculated. Here, when cost_TMP_CB is equal to or less than a preset value, the encoder sets a flag_overlay value to the first value for signaling. On the other hand, cost_TMP_CB exceeds the preset value, the encoder sets the flag_overlay value to the second value for signaling. The encoder applies different weighting factors to each row of the top template and/or each column of the left template according to mode_CB, thereby calculating cost_TMP_CB value. Here, the weighting factor may be determined according to the following methods.

For example, regardless of mode_CB, the same weighting factor may be applied to the left template and the top template. As another example, when mode_CB is one of the horizontal direction modes, the weighting factor of the left template is set to be larger than the weighting factor of the top template. As another example, when mode_CB is one of the vertical direction modes, the weighting factor of the top template is set to be larger than the weighting factor of the left template. As another example, when mode_CB is one of the diagonal direction modes, the weighting factor of the top template is set to be equal to the weighting factor of the left template.

Further, when calculating the cost value, the template used for cost_TMP_CB calculation is set to be different according to mode_CB. Specifically, the template used for cost_TMP_CB calculation may be determined according to the following methods.

For example, regardless of mode_CB, both the left template and the top template are used for cost_TMP_CB calculation. As another example, when mode_CB is one of the horizontal direction modes, the left template is used for cost_TMP_CB calculation. As another example, when mode_CB is one of the vertical direction modes, the top template is used for cost_TMP_CB calculation. As another example, when mode_CB is one of the diagonal direction modes, the top template and the left template are used for cost_TMP_CB calculation.

When the value of flag_combined that is entropy decoded by the decoder is a first value, the decoder derives an adjacent mode indicator (index) required for intra prediction using the overlay predictor. When the number of adjacent modes used for intra prediction using the overlay predictor is K, the decoder compares the cost_TMP_CB value calculated from mode_CB with the cost_TMP_NGB value calculated from mode_NGB that is one mode of K adjacent modes. Here, the decoder may compare cost_TMP_NGB of mode_NGB that has the smallest cost value among multiple mode_NGBs with the cost_TMP_CB value finally.

As the result of cost comparison by the decoder, when satisfying cost_TMP_NGB<cost_TMP_CB+C, the decoder performs intra prediction using the overlay predictor according to Equation 15 described above. Here, C may be an arbitrary constant. For example, the value of C may be zero.

Further, as the result of cost comparison by the decoder, when satisfying cost_TMP_NGB≥cost_TMP_CB+C, the decoder performs intra prediction using Pred_mode_CB generated in mode_CB.

Hereinafter, a method of performing prediction on the current block through overlay prediction of intra prediction and inter prediction will be described.

Prediction on the current block may be performed using a weighted sum of a value predicted using a predetermined intra prediction mode and a value predicted using a predetermined inter prediction mode. Here, the weighting factors may be applied differently according to at least one among the coding mode, the intra prediction mode, the inter prediction mode, the size/shape of the current block, and the position of the prediction sample.

For example, when the intra prediction mode is the non-directional mode, such as DC or planar mode, a weighting factor of ½ is applied to the intra prediction sample and the inter prediction sample. That is, the ratio of the weighting factor applied to the intra prediction mode and the inter prediction mode may be 1:1.

Alternatively, when the intra prediction mode is the vertical mode, the weighting factor value for the intra prediction sample decreases as the distance from the top reference sample increases. Conversely, the weighting factor value for the inter prediction sample increases as the distance from the top reference sample increases. That is, when the intra prediction mode is the vertical mode, as the y-axis value of the current block increases, the weighting factor value for the intra prediction sample decreases, and the weighting factor value for the inter prediction sample increases.

Here, when the intra prediction mode is the vertical mode, this means that the value of the intra prediction mode is 50.

Similarly, when the intra prediction mode is the horizontal mode, the weighting factor value for the intra prediction sample decreases as the distance from the left reference sample increases. Conversely, the weighting factor value for the inter prediction sample increases as the distance from the left reference sample increases. That is, when the intra prediction mode is the horizontal mode, as the x axis value of the current block increases, the weighting factor value for the intra prediction sample decreases, and the weighting factor value for the inter prediction sample increases.

Here, when the intra prediction mode is the horizontal mode, this means that the value of the intra prediction mode is 18.

The sum of the weighting factor value applied to the intra prediction sample and the weighting factor value applied to the inter prediction sample may be the power of two (for example, 4, 8, 16, and 32). Specifically, when the weighting factor for the intra prediction mode is w1 and the weighting factor for the inter prediction mode is w2, a relation of w1+w2=$2^N$ is established. For example, N may be three.

Further, when the size of the current block is in a predetermined range, the weighting factor of ½ (ratio of 1:1) may be applied to the intra prediction sample and the inter prediction sample. For example, when the horizontal or vertical size of the current block is smaller than a value of four, the weighting factor ratio is determined to be 1:1.

The intra prediction mode may be fixed to be one among the DC mode and the planar mode or may be determined by being signaled. Alternatively, the intra prediction mode may be one of MPM candidate modes and may be determined by signaling the MPM index. The MPM candidate modes may be derived using the intra prediction mode of the neighboring block, and the mode of the neighboring block may be changed to a predetermined representative mode. For example, when the intra prediction mode of the neighboring block is the directional mode in the vertical direction, the mode is changed to the vertical mode. When being the directional mode in the horizontal direction, the mode is changed to the horizontal mode.

The inter prediction mode may be at least one among a skip mode, a merge mode, and an AMVP mode. That is, when the inter prediction mode of the current block is the merge mode, prediction on the current block is performed using a weighted sum of the inter prediction value predicted using motion information which corresponds to the merge index and of the value predicted using the DC or planar mode.

Hereinbelow, a method of performing, by the decoder, interpolation prediction by using one or more reference sample lines will be described.

Figure 21:
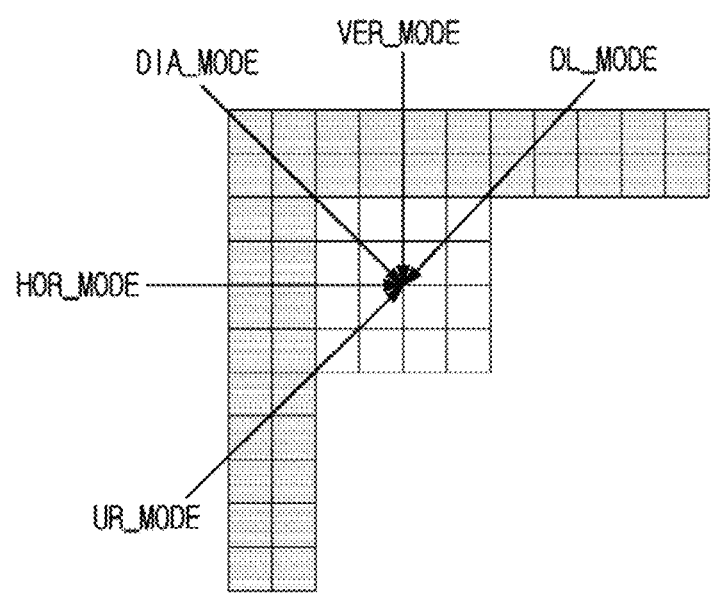
FIG. 21 is a diagram illustrating a directional mode of an intra prediction mode.

FIG. 21 is a diagram illustrating a directional mode of an intra prediction mode.

FIG. 21 shows a classification of the intra prediction modes into several modes. Specifically, the intra prediction mode in the horizontal direction may be classified as HOR_MODE, the intra prediction mode in the vertical direction may be classified as VER_MODE, the intra prediction mode in the direction toward the bottom right may be classified as DIA_MODE, and the intra prediction mode in the direction toward the top right may be classified as UR_MODE, and the intra prediction mode in the direction toward the bottom left may be classified as DL_MODE. Here, the decoder may, according to the intra prediction mode CUR_MODE of the current block, perform interpolation prediction using multiple reference sample lines with one of the following methods.

For example, HOR_MODE may mean the intra prediction mode in which the angle of intra prediction is parallel to the x-axis. VER_MODE may mean the intra prediction mode in which the angle of intra prediction is parallel to the y-axis. DIA_MODE may mean the prediction mode in which the angle of intra prediction is a 45 degree angle to the top left with respect to the x-axis. UR_MODE may mean the prediction mode in which the angle of intra prediction is a 45 degree angle to the bottom left with respect to the x-axis. DL_MODE may mean the prediction mode in which the angle of intra prediction is a 45 degree angle to the top right with respect to the x-axis. DC_MODE may mean the prediction mode according to the DC mode, and PLANAR_MODE may mean the prediction mode according to planar prediction.

FIGS. 22 to 25 are diagrams illustrating a method of performing interpolation prediction by using a reference sample line according to the present invention.

Figure 22:
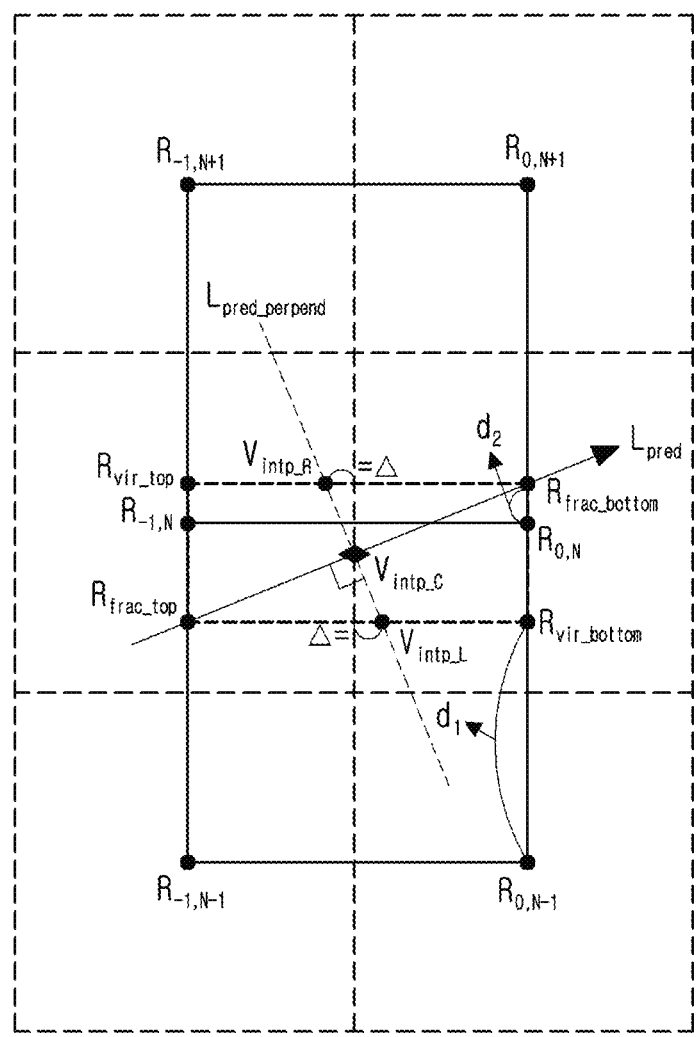
FIGS. 22 to 25 are diagrams illustrating a method of performing interpolation prediction by using a reference sample line according to the present invention.
Figure 23:
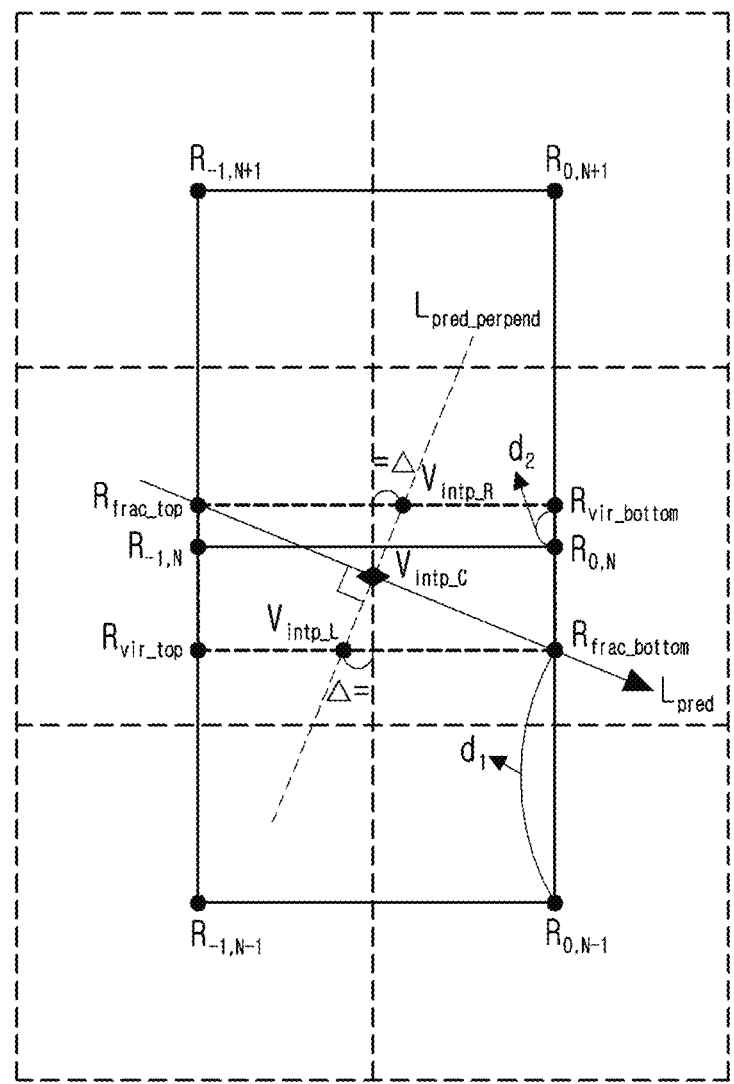
Figure 24:
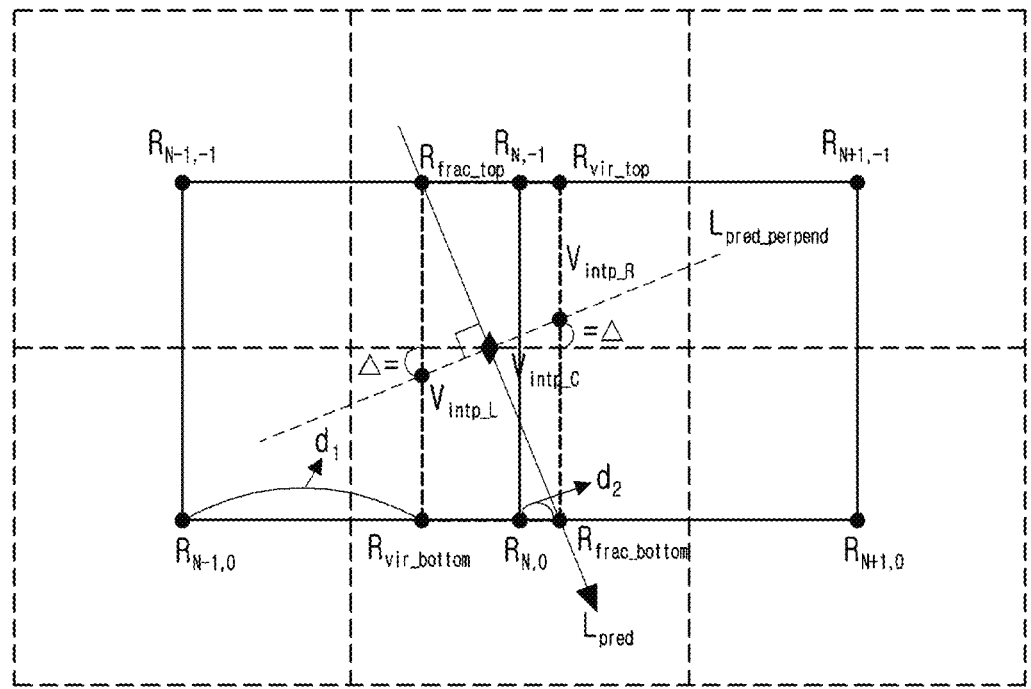
Figure 25:
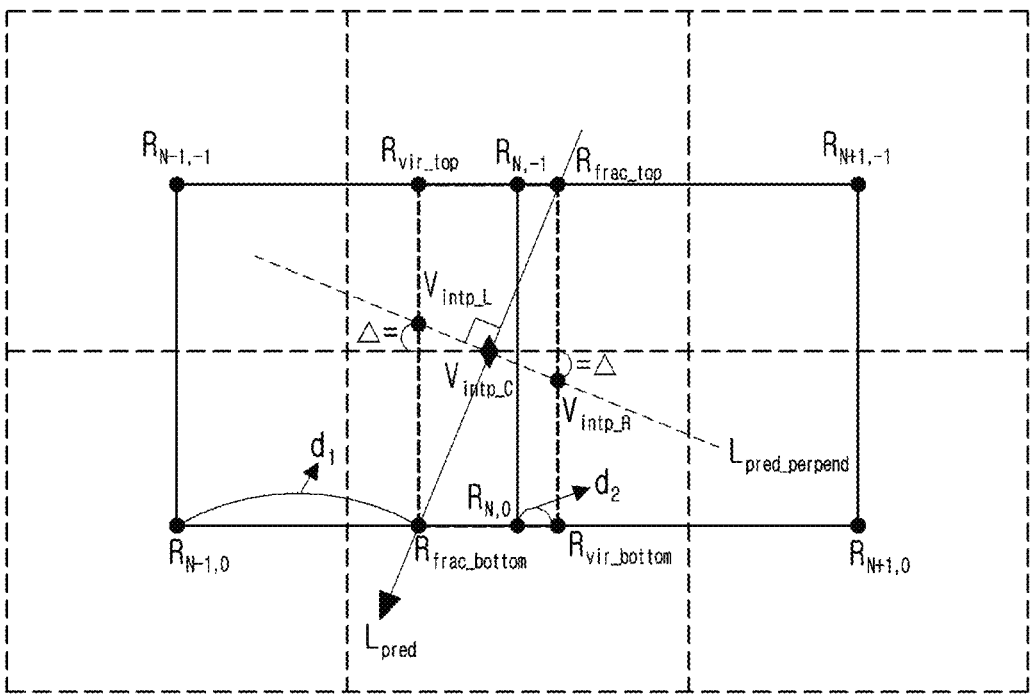

For example, FIG. 22 shows an example in which when satisfying CUR_MODE<HOR_MODE, interpolation prediction is performed using multiple reference sample lines. FIG. 23 shows an example in which when satisfying HOR_MODE<CUR_MODE<DIA_MODE, interpolation prediction is performed using multiple reference sample lines. FIG. 24 shows an example in which when satisfying DIA_MODE<CUR_MODE<VER_MODE, interpolation prediction is performed using multiple reference sample lines. FIG. 25 shows an example in which when satisfying CUR_MODE>VER_MODE, interpolation prediction is performed using multiple reference sample lines.

As another example, when CUR_MODE is one among DC_MODE, PLANAR_MODE, UR_MODE, DIA_MODE, VER_MODE, and DL_MODE, the decoder performs intra prediction using a weighted sum of integer reference samples that are positioned in each reference sample line without performing interpolation.

In FIGS. 22 and 23, L_pred may mean the prediction direction corresponding to CUR_MODE. (R_0,N−1), (R_0,N), and (R_0,N+1) may mean three consecutive reference samples on a first reference sample line used for interpolation. (R_−1,N−1), (R_−1,N), and (R_−1,N+1) may mean three consecutive reference samples on a second reference sample line used for interpolation. Further, R_frac_bottom may mean the intersection point of the first reference sample line and L_pred, and R_frac_top may mean the intersection point (integer or decimal point position) of the second reference sample line and L_pred. Here, both R_frac_bottom and R_frac_top may mean the positions corresponding to integer or decimal point positions.

Further, on the second reference sample line, a sub-pixel that is positioned at the same y-coordinate position as R_frac_bottom may be defined as R_vir_top. On the first reference sample line, a sub-pixel that is positioned at the same y-coordinate position as R_frac_top may be defined as R_vir_bottom.

Further, in FIG. 22, the distance from (R_0,N−1) to R_vir_bottom may be defined as d1, and the distance from (R_0,N) to R_frac_bottom may be defined as d2. In FIG. 23, the distance from (R_0,N−1) to R_frac_bottom may be defined as d1, and the distance from (R_0,N) to R_vir_bottom may be defined as d2.

Here, the middle point between R_frac_bottom and R_frac_top may be defined as V_intp_C, and the straight line that passes through V_intp_C and is orthogonal to L_pred may be defined as L_pred_perpend. The intersection point of L_pred_perpend and the straight line connecting R_frac_bottom and R_vir_top may be defined as V_intp_R in FIG. 22 and may be defined as V_intp_L in FIG. 23. The intersection point of L_pred_perpend and the straight line connecting R_vir_bottom and R_frac_top may be defined as V_intp_L in FIG. 22 and may be defined as V_intp_R in FIG. 23. Here, the shortest distance between the vertical straight line passing through V_intp_C and V_intp_L or V_intp_R may be defined as a delta (Δ).

In FIGS. 24 and 25, L_pred may mean the prediction direction corresponding to CUR_MODE. (R_N−1,0), (R_N,0), and (R_N+1,0) may mean three consecutive reference samples on the first reference sample line used for interpolation. (R_N−1,−1), (R_N,−1), and (R_N+1,−1) may mean three consecutive reference samples on the second reference sample line used for interpolation. Further, R_frac_bottom may mean the intersection point of the first reference sample line and L_pred, and R_frac_top may mean the intersection point of the second reference sample line and L_pred. Here, both R_frac_bottom and R_frac_top may mean the positions corresponding to integer or decimal point positions.

Further, on the second reference sample line, a sub-pixel that is positioned at the same x-coordinate position as R_frac_bottom may be defined as R_vir_top. On the first reference sample line, a sub-pixel that is positioned at the same x-coordinate position as R_frac_top may be defined as R_vir_bottom.

Further, in FIG. 24, the distance from (R_N−1,0) to R_vir_bottom may be defined as d1, and the distance from (R_N,0) to R_frac_bottom may be defined as d2. In FIG. 25, the distance from (R_N−1,0) to R_frac_bottom may be defined as d1, and the distance from (R_N,0) to R_vir_bottom may be defined as d2.

Here, the middle point between R_frac_bottom and R_frac_top may be defined as V_intp_C, and the straight line that passes through V_intp_C and is orthogonal to L_pred may be defined as L_pred_perpend. The intersection point of L_pred_perpend and the straight line connecting R_frac_bottom and R_vir_top may be defined as V_intp_R in FIG. 24 and may be defined as V_intp_L in FIG. 25. The intersection point of L_pred_perpend and the straight line connecting R_vir_bottom and R_frac_top may be defined as V_intp_L in FIG. 24 and may be defined as V_intp_R in FIG. 25. Here, the shortest distance between the horizontal straight line passing through V_intp_C and V_intp_L or V_intp_R may be defined as a delta (Δ).

Here, in FIG. 22, R_frac_bottom, R_vir_bottom, R_frac_top, and R_vir_top may be derived according to Equation 16 below.

$$R_{vir\_bottom} = \{(F-d_1) \cdot R_{0,N-1} + d_1 \cdot R_{0,N} + F/2\} >> N$$

$$R_{frac\_bottom} = \{(F-d_2) \cdot R_{0,N} + d_2 \cdot R_{0,N+1} + F/2\} >> N$$

$$R_{vir\_top} = \{(F-d_2) \cdot R_{-1,N} + d_2 \cdot R_{-1,N+1} + F/2\} >> N$$

$$R_{frac\_top} = \{(F-d_1) \cdot R_{-1,N-1} + d_1 \cdot R_{-1,N} + F/2\} >> N \qquad \text{[Equation 16]}$$

Further, in FIG. 23, R_frac_bottom, R_vir_bottom, R_frac_top, and R_vir_top may be obtained according to Equation 17 below.

$$R_{frac\_bottom} = \{(F-d_1) \cdot R_{0,N-1} + d_1 \cdot R_{0,N} + F/2\} >> N$$

$$R_{vir\_bottom} = \{(F-d_2) \cdot R_{0,N} + d_2 \cdot R_{0,N+1} + F/2\} >> N$$

$$R_{frac\_top} = \{(F-d_2) \cdot R_{-1,N} + d_2 \cdot R_{-1,N+1} + F/2\} >> N$$

$$R_{vir\_top} = \{(F-d_1) \cdot R_{-1,N-1} + d_1 \cdot R_{-1,N} + F/2\} >> N \qquad \text{[Equation 17]}$$

Further, in FIG. 24, R_frac_bottom, R_vir_bottom, R_frac_top, and R_vir_top may be derived according to Equation 18 below.

$$R_{virr\_bottom} = \{(F-d_1) \cdot R_{N-1,0} + d_1 \cdot R_{N,0} + F/2\} >> N$$

$$R_{frac\_bottom} = \{(F-d_2) \cdot R_{N,0} + d_2 \cdot R_{N+1,0} + F/2\} >> N$$

$$R_{virr\_top} = \{(F-d_2) \cdot R_{N,-1} + d_2 \cdot R_{N+1,-1} + F/2\} >> N$$

$$R_{frac\_top} = \{(F-d_1) \cdot R_{N-1,-1} + d_1 \cdot R_{N,-1} + F/2\} >> N \quad \text{[Equation 18]}$$

Further, in FIG. 25, R_frac_bottom, R_vir_bottom, R_frac_top, and R_vir_top may be derived according to Equation 19 below.

$$R_{frac\_bottom} = \{(F-d_1) \cdot R_{N-1,0} + d_1 \cdot R_{N,0} + F/2\} >> N$$

$$R_{virr\_bottom} = \{(F-d_2) \cdot R_{N,0} + d_2 \cdot R_{N+1,0} + F/2\} >> N$$

$$R_{frac\_top} = \{(F-d_2) \cdot R_{N,-1} + d_2 \cdot R_{N+1,-1} + F/2\} >> N$$

$$R_{virr\_top} = \{(F-d_1) \cdot R_{N-1,-1} + d_1 \cdot R_{N,-1} + F/2\} >> N \quad \text{[Equation 19]}$$

In FIGS. 22 to 25, when the distance between R_frac_bottom and R_vir_bottom is W_R, and the distance between R_frac_bottom and R_vir_top is H_R, the delta (Δ) is derived according to Equation 20 below.

$$\frac{H_R}{W_R} \cdot \frac{-\Delta}{W_R/2} = -1 \Leftrightarrow \Delta = \frac{W_R^2}{2 \cdot H_R} \quad \text{[Equation 20]}$$

Further, in FIGS. 22 and 24, V_intp_L, V_intp_R, and V_intp_C may be derived according to Equation 21 below.

$$V_{intp\_L} = \left[\left\{\left(\frac{F_1}{2} + \Delta + w_1\right) \cdot R_{frac\_bottom} + \right.\right.$$
$$\left.\left.\left\{\frac{F_1}{2} - \Delta + (F_2 - w_1)\right\} \cdot R_{vir\_top} + \frac{(F_1 - F_2)}{2}\right] >> N_1$$

$$V_{intp\_R} = \left[\left\{\left(\frac{F_1}{2} - \Delta + w_1\right) \cdot R_{frac\_bottom} + \right.\right.$$
$$\left.\left.\left\{\frac{F_1}{2} + \Delta + (F_2 - w_1)\right\} \cdot R_{vir\_top} + \frac{(F_1 - F_2)}{2}\right] >> N_1$$

$$V_{intp\_C} = \left\{w_2 \cdot R_{frac\_bottom} + (F_3 - w_2) \cdot R_{frac\_bottom} + \frac{F_3}{2}\right\}$$
$$>> N_2$$

[Equation 21]

Further, in FIGS. 23 and 25, V_intp_L, V_intp_R, and V_intp_C may be derived according to Equation 22 below.

$$V_{intp\_L} = \left[\left\{\left(\frac{F_1}{2} - \Delta + w_1\right) \cdot R_{frac\_bottom} + \right.\right.$$
$$\left.\left.\left\{\frac{F_1}{2} + \Delta + (F_2 - w_1)\right\} \cdot R_{vir\_top} + \frac{(F_1 - F_2)}{2}\right] >> N_1$$

$$V_{intp\_R} = \left[\left\{\left(\frac{F_1}{2} + \Delta + w_1\right) \cdot R_{frac\_bottom} + \right.\right.$$
$$\left.\left.\left\{\frac{F_1}{2} - \Delta + (F_2 - w_1)\right\} \cdot R_{vir\_top} + \frac{(F_1 - F_2)}{2}\right] >> N_1$$

$$V_{intp\_C} = \left\{w_2 \cdot R_{frac\_bottom} + (F_3 - w_2) \cdot R_{frac\_bottom} + \frac{F_3}{2}\right\}$$
$$>> N_2$$

[Equation 22]

In Equation 21 and Equation 22 above, F1, F2, and F3 may mean interpolation of a sub-pixel of '1/F'-pel. Also, F1, F2, and F3 may be exponentiation of two. For example, each of F1, F2, and F3 may be one among 2, 4, 8, 16, 32, 64, and 2^n. Further, N1 may be a value satisfying the condition of (F1+F2)=2^N1. For example, if F1=F2=32, then N=6. Further, N2 may be a value satisfying the condition of F3=2^N2. For example, if F3=32, then N=5.

The final interpolation value V_intp may be derived according to Equation 23 below.

$$V_{intp} = \left\{w_L \cdot V_{intp\_L} + w_C \cdot V_{intp\_C} + \right.$$
$$\left. w_R \cdot V_{intp\_R} + \frac{(w_L + w_C + w_R)}{2}\right\} >> N_F$$

[Equation 23]

Specifically, V_intp may be derived using the weighted sum of V_intp_C, V_intp_L, and V_intp_R. Here, W_C, W_L, and W_R may be weighting factors of respective values, WC+WL+WR may be exponentiation of two. Further, NF may be a value satisfying the condition of (W_C+W_L+W_R)=2^N. For example, if W_C=6, W_L=1, and W_R=1, then N=3.

Another example in which interpolation prediction is performed using two reference sample lines may be extended to an example in which interpolation prediction is performed using N reference sample lines in the same manner. That is, the above-described example may be applied in an extended manner to the example in which interpolation prediction is performed using two or more reference sample lines.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, additional identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

When a motion vector having at least one of a 16-pel unit, an 8-pel unit, a 4-pel unit, an integer-pel unit, ⅛-pel unit, 1/16-pel unit, 1/32-pel unit and 1/64-pel unit, the above embodiments of the present invention can also be applied. The motion vector may be selectively used for each pixel unit.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. A method of decoding an image, the method comprising:
    deriving an intra prediction mode for a current block;
    deriving a reference sample for the current block; and
    performing intra prediction on the current block by using the derived reference sample,
    wherein the reference sample is included in a reference sample line,
    wherein the reference sample line is derived by selecting one reference sample line among a plurality of neighboring reference sample lines of the current block based on a position of the current block within a coding tree block,
    wherein when an upper boundary of the current block, partitioned from the coding tree block, corresponds to an upper boundary of the coding tree block, the reference sample line is derived by selecting a reference sample line closest to the current block,
    wherein the reference sample is derived by performing filtering samples of the selected reference sample line only when the selected reference sample line is the reference sample line closest to the current block among the plurality of neighboring reference sample lines, and
    wherein the filtering is performed only using the reference sample of the reference sample line closest to the current block.

2. The method of claim 1, wherein the reference sample line is derived based on a reference sample line indicator obtained from a bitstream.

3. The method of claim 2, wherein the reference sample line indicator indicates which of the plurality of neighboring reference sample lines is a reference sample line.

4. The method of claim 2, when an upper boundary of the current block corresponds to a boundary of a coding tree block, wherein the reference sample line indicator is not obtained from the bitstream and is set to a predetermined value.

5. The method of claim 1, when the reference sample corresponds to a predetermined position, the reference sample is derived by padding a sample adjacent to the predetermined position without determining availability of the block at the predetermined position.

6. The method of claim 1, when the current block is a combined prediction of intra prediction and inter prediction, the intra prediction mode for the current block is fixed to a planar mode.

7. The method of claim 4, when an upper boundary of the current block corresponds to a boundary of a coding tree block, wherein the reference sample line indicator set to the predetermined value indicates the reference sample line closest to the current block.

8. A method of encoding an image, the method comprising:
- deriving an intra prediction mode for a current block;
- deriving a reference sample for the current block; and
- performing intra prediction on the current block by using the derived reference sample,
- wherein the reference sample is included in a reference sample line,
- wherein the reference sample line is derived by selecting one reference sample line among a plurality of neighboring reference sample lines of the current block based on a position of the current block within a coding tree block,
- wherein when an upper boundary of the current block, partitioned from the coding tree block, corresponds to an upper boundary of the coding tree block, the reference sample line is derived by selecting a reference sample line closest to the current block,
- wherein the reference sample is derived by performing filtering samples of the selected reference sample line only when the selected reference sample line is the reference sample line closest to the current block among the plurality of neighboring reference sample lines, and
- wherein the filtering is performed only using the reference sample of the reference sample line closest to the current block.

9. A non-transitory storage medium storing a bitstream generated by a method of encoding an image, the method including:
- deriving an intra prediction mode for a current block;
- deriving a reference sample for the current block; and
- performing intra prediction on the current block by using the derived reference sample,
- wherein the reference sample is included in a reference sample line,
- wherein the reference sample line is derived by selecting one reference sample line among a plurality of neighboring reference sample lines of the current block based on a position of the current block within a coding tree block,
- wherein when an upper boundary of the current block, partitioned from the coding tree block, corresponds to an upper boundary of the coding tree block, the reference sample line is derived by selecting a reference sample line closest to the current block,
- wherein the reference sample is derived by performing filtering samples of the selected reference sample line only when the selected reference sample line is the reference sample line closest to the current block among the plurality of neighboring reference sample lines, and
- wherein the filtering is performed only using the reference sample of the reference sample line closest to the current block.

* * * * *